United States Patent
Seyama

(10) Patent No.: US 9,531,493 B2
(45) Date of Patent: Dec. 27, 2016

(54) RECEIVING APPARATUS, METHOD FOR RECEIVING, TRANSMITTING APPARATUS, METHOD FOR TRANSMITTING, AND WIRELESS COMMUNICATION SYSTEM

(71) Applicant: FUJITSU LIMITED, Kawasaki-shi, Kanagawa (JP)

(72) Inventor: Takashi Seyama, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 14/669,103

(22) Filed: Mar. 26, 2015

(65) Prior Publication Data

US 2015/0295670 A1 Oct. 15, 2015

(30) Foreign Application Priority Data

Apr. 10, 2014 (JP) ................. 2014-080709

(51) Int. Cl.
*H04J 11/00* (2006.01)
*H04L 5/00* (2006.01)
(Continued)

(52) U.S. Cl.
CPC ............. *H04J 11/005* (2013.01); *H04B 7/068* (2013.01); *H04B 7/0669* (2013.01);
(Continued)

(58) Field of Classification Search
CPC .... H04L 1/0606; H04L 1/0668; H04L 5/0023; H04L 5/005; H04L 5/0073; H04B 7/068; H04B 7/0697; H04B 7/0669; H04J 13/00; H04J 13/004; H04J 11/00; H04J 11/05; H04J 11/005; H04M 13/251; H04W 72/0446; H04W 72/0453; H04W 72/046
(Continued)

(56) References Cited

U.S. PATENT DOCUMENTS 7,860,183 B2 * 12/2010 Maltsev ................. H04B 7/043
370/208
7,877,064 B2 * 1/2011 Schmidt ................ H04L 1/0041
370/347

(Continued)

FOREIGN PATENT DOCUMENTS

| JP | 2010-527209 | 8/2010 |
| JP | 2011-77940 | 4/2011 |
| JP | 5326976 | 10/2013 |

OTHER PUBLICATIONS

3GPP TSG RAN WG4 Meeting #59AH, R4-113528, NTT DOCOMO, "Performance of Interference Rejection Combining Receiver for LTE", Jun. 27-Jul. 1, 2011 (10 pages).

(Continued)

*Primary Examiner* — Luat Phung
*Assistant Examiner* — Thomas R Cairns
(74) *Attorney, Agent, or Firm* — Fujitsu Patent Center

(57) ABSTRACT

A receiving apparatus includes a plurality of antennas that includes a first antenna and a second antenna; a receiver, and a processor. The receiver receives a wireless signal containing a pair of coded signals, being coded in Alamouti-type coding, through the plurality of antennas. The processor estimates a correlation between an undesired wave signal component of one of the pair of coded signals received through the first antenna and an undesired wave signal component of the other of the pair of coded signals received through the second antenna, and processes the received wireless signal using the estimated correlation.

20 Claims, 23 Drawing Sheets

(51) Int. Cl.
*H04B 7/06* (2006.01)
*H04L 1/06* (2006.01)

(52) U.S. Cl.
CPC ............ *H04L 1/0668* (2013.01); *H04L 5/005* (2013.01); *H04L 5/0023* (2013.01); *H04L 5/0073* (2013.01)

(58) Field of Classification Search
USPC .................. 375/347; 370/329, 334, 203, 204
See application file for complete search history.

(56) References Cited

U.S. PATENT DOCUMENTS

| | | | | |
|---|---|---|---|---|
| 8,711,797 | B2* | 4/2014 | Kim | H04L 5/001 370/277 |
| 9,054,924 | B2* | 6/2015 | Kwak | H04B 7/0417 |
| 2007/0211815 | A1* | 9/2007 | Pan | H04B 7/0689 375/267 |
| 2009/0322613 | A1* | 12/2009 | Bala | H04B 7/022 342/373 |
| 2011/0075770 | A1 | 3/2011 | Seyama | |
| 2011/0151910 | A1* | 6/2011 | Kim | H04L 5/003 455/509 |
| 2012/0275496 | A1 | 11/2012 | Haghighat et al. | |
| 2015/0036698 | A1* | 2/2015 | Umeda | H04B 7/0669 370/503 |

OTHER PUBLICATIONS

3GPP TS RAN WG4 Meeting #62bis, R4-121552, NT DOCOMO, "Test coverage for MMSE-IRC receiver requirements", Mar. 26-30, 2012 (7 pages).

* cited by examiner

RECEIVING APPARATUS, METHOD FOR RECEIVING, TRANSMITTING APPARATUS, METHOD FOR TRANSMITTING, AND WIRELESS COMMUNICATION SYSTEM

CROSS-REFERENCE TO RELATED APPLICATION

This application is based upon and claims the benefit of priority of the prior Japanese Patent application No. 2014-080709, filed on Apr. 10, 2014, the entire contents of which are incorporated herein by reference.

FIELD

The embodiments discussed herein are a receiving apparatus, a method for receiving, a transmitting apparatus, a method for transmitting, and a wireless communication system.

BACKGROUND

A wireless communication system including a base station and a mobile station has been known. The mobile station includes a receiving apparatus that receives a wireless signal from the base station. The base station includes a receiving apparatus that receives a wireless signal from the mobile station. The mobile station wirelessly communicates with the base station in a wireless area that the base station forms.

In wireless communication between a mobile station and a base station in a certain wireless area, a wireless signal transmitted in another wireless area is received as an interfering wave by the mobile station and the base station. Such an interfering wave degrades reception quality representing the quality of signals obtained by demodulating the respective received signals in the mobile station and the base station. In particular, since an interfering wave tends to be large at the edge of a wireless area (i.e., near the boundary between the wireless area and another wireless area), the reception quality of a mobile station at the edge of the wireless area tends to be degraded.

With the above in view, there is studied an Interference Rejection Combining (IRC) receiving apparatus that carries out a process to inhibit degrading of reception quality due to interference noise containing an interfering wave and noise (see, for example, Patent Literature 1, Non-Patent Literature 1, and Non-Patent Literature 2). This process is called IRC process. For example, an IRC receiving apparatus determines a reception weight by using statistical characteristic of interference noise, and demodulates a received wireless signal using the determined reception weight, so that degrading of the reception quality due to interference noise contained in the received signal can be inhibited.

Another wireless communication system that transmits a wireless signal containing a pair of coded signals, being coded in the Alamouti-type coding, has been known (see, for example Patent Literature 1, Non-Patent Literature 1, and Non-Patent Literature 2). This wireless communication system transmits a wireless signal containing a pair of coded signals coded in the scheme of Space Frequency Block Coding (SFBC).

[Patent Literature 1] Japanese National Publication of International Application No. 2010-527209
[Non-Patent Literature 1] NTT DOCOMO, "Performance of Interference Rejection Combining Receiver for LTE", 3GPP, R4-113528, June, 2011
[Non-Patent Literature 2] NTT DOCOMO, "Test coverage for MMSE-IRC receiver requirements", 3GPP, R4-121552, March, 2012

SUMMARY

As an aspect, a receiving apparatus includes a plurality of antennas including a first antenna and a second antenna, a receiver, and a processor. The receiver receives a wireless signal containing a pair of coded signals, being coded in Alamouti-type coding, through the plurality of antennas. The processor estimates a correlation, and processes the received wireless signal using the estimated correlation. The estimated correlation is one correlation between an undesired wave signal component of one of the pair of coded signals received through the first antenna and an undesired wave signal component of the other of the pair of coded signals received through the second antenna.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
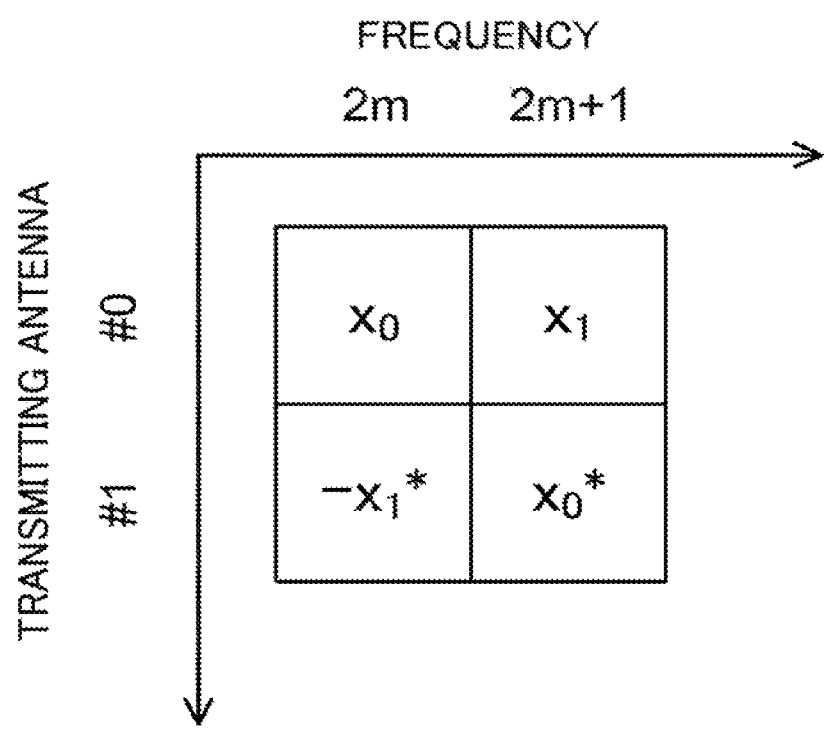
FIG. 1 is a diagram illustrating an example of a pair of coded signals being coded in the scheme of space frequency block coding.

First of all, description will now be made in relation to the overview of an IRC process. Here, the description focuses on an IRC process performed in a mobile station. A received signal in a resource element (RE) of the l-th symbol time of the k-th subcarrier in the Orthogonal Frequency-Division Multiplexing (OFDM) scheme is expressed by Expression 1. The l-th symbol time is a time corresponding to the l-th OFDM symbol along the time axis.

$$y(k,l) = H(k,l)V(k,l)x(k,l) + \sum_{i=1}^{N_{cell}} H_i(k,l)V_i(k,l)x_i(k,l) + n(k,l) \quad \text{[Expression 1]}$$

Here, the term $y(k,l)$ represents a received signal and is a $N_r \times 1$ vector. The term $N_r$ represents the number of receiving antennas that the mobile station uses. The term $H(k,l)$ represents a channel between the base station and the mobile station in a serving cell and is a $N_r \times N_t$ matrix. A serving cell is a wireless area accommodating the mobile station. The term $N_t$ represents the number of transmitting antennas that the base station uses in the serving cell.

The term $V(k,l)$ is a $N_t \times N_{stream}$ transmitting precoding matrix in the serving cell. The term $N_{stream}$ represents the number of streams contained in a desired signal. A desired signal is a wireless signal that the base station transmits to the mobile station in the serving cell and is also referred to as a transmitted signal. The term $x(k,l)$ represents the desired signal and is an $N_{stream} \times 1$ vector.

The term $N_{cell}$ represents the number of interfering cells, which are wireless areas different from the serving cell. The term $H_i(k,l)$ represents a channel between the base station and the mobile station in an i-th interfering cell and is an $N_r \times N_{t,i}$ matrix. The term $N_{t,i}$ represents the number of transmitting antennas that the base station uses in the i-th interfering cell. The term $V_i(k,l)$ is an $N_{t,i} \times N_{stream,i}$ transmitting precoding matrix in an i-th interfering cell. The term $N_{stream,i}$ represents the number of streams contained in a wireless signal transmitted in the i-th interfering cell.

The term $x_i(k,l)$ represents a wireless signal transmitted in the i-th interfering cell and is an $N_{stream,i} \times 1$ vector. The term $n(k,l)$ represents Additive White Gaussian Noise (AWGN) and an $N_r \times 1$ vector.

A reception weight $W_{IRC}(k,l)$ to demodulate a received signal is expressed by Expression 2 conforming to a method of minimizing the average of the squared error between a signal obtained by demodulating the received signal and a desired signal. This method is also referred to as a Minimum Mean Squared Error (MMSE) Criterion.

$$W_{IRC}(k,l) = \text{argmin} E[Tr(W_{IRC}(k,l)y(k,l) - x(k,l))(W_{IRC}(k,l)y(k,l) - x(k,l))^H] \quad \text{[Expression 2]}$$

Here, the term $E[A]$ represents the average of A. The term $Tr(A)$ represents the trace of matrix A. Accordingly, Expression 3 is derived from Expression 2.

$$W_{IRC}(k,l) = (H(k,l)V(k,l))^H (E[y(k,l)y^H(k,l)])^{-1} \quad \text{[Expression 3]}$$

Here, the term $E[y(k,l)y^H(k,l)]$ represents a covariance matrix $R_{yy}$ of the received signal. The covariance matrix $R_{yy}$ can be estimated by each of two methods disclosed in Patent Literature 1, Non-Patent Literature 1, and Non-Patent Literature 2.

As denoted in Expression 4, the first method of estimation calculates the average of the products of the received signal $y(k,l)$ and the Hermitian conjugate $y^H(k,l)$ thereof.

$$R_{e,yy} = E[y(k,l)y^H(k,l)] \quad \text{[Expression 4]}$$

The second method of estimation uses a reference signal (RS). The mobile station uses a known reference signal, which is transmitted in the serving cell for synchronous detection, for estimating a channel between the base station and the mobile station in the serving cell. An estimated value of a component caused from a reference signal in the serving cell included in the received signal is expressed by Expression 5, which is based on the product of the estimated value $H_e(k,l)$ of a channel matrix and the reference signal $x_{RS}(k,l)$. The estimated value of a component caused from a reference signal in the serving cell included in the received signal is also referred to as a replica signal.

$$H_e(k,l)V(k,l)x_{RS}(k,l) \quad \text{[Expression 5]}$$

The interfering noise $y_a(k,l)$ in the received signal is expressed by Expression 6 that subtracts the replica signal from the received signal $y(k,l)$.

$$y_a(k,l) = y(k,l) - H_e(k,l)V(k,l)x_{RS}(k,l) \quad \text{[Expression 6]}$$

From Expression 6, the covariance matrix $R_{e,I+N}$ for the interference noise in the received signal is expressed by Expression 7.

$$R_{e,I+N} = E[y_a(k,l)y_a^H(k,l)] \quad \text{[Expression 7]}$$

From Expression 7, the covariance matrix $R_{e,yy}$ for the received signal is expressed by Expression 8.

$$R_{e,yy} = \{H_e(k,l)V(k,l)\}\{H_e(k,l)V(k,l)\}^H + R_{e,I+N} \quad \text{[Expression 8]}$$

For example, in the LTE scheme defined in the 3GPP, a wireless signal containing a pair of coded signals coded in the space frequency block coding (SFBC) is transmitted. Here, the term 3GPP is the abbreviation for Third Generation Partnership Project, and the term LTE is the abbreviation for Long Term Evolution.

As illustrated in FIG. 1, the pair of coded signals coded in the space frequency block coding is transmitted from multiple transmitting antennas using REs of two subcarriers adjacent to each other along the frequency axis. A pair of coded signals is also referred to as an SFBC pair.

As illustrated in FIG. 1, one coded signal of the m-th SFBC pair is transmitted using the RE of the 2m-th subcarrier. The symbol m represents an integer equal to or more than zero. One coded signal of the m-th SFBC pair contains a first transmitting symbol $x_0$ transmitted from a first transmitting antenna #0 and a second transmitting symbol $-x_1^*$ transmitted from a second transmitting antenna #1. Here, the term X* represents the complex conjugate of X.

Also as illustrated in FIG. 1, the other coded signal of the m-th SFBC pair is transmitted using RE of the (2m+1)-th subcarrier. The other coded signal of the m-th SFBC pair contains a third transmitting symbol $x_1$ transmitted from the first transmitting antenna #0 and a fourth transmitting symbol $x_0^*$ transmitted from the second transmitting antenna #1.

The SFBC scheme can enhance the quality of wireless communication by means of transmitting diversity.

An IRC process when the SFBC is performed on a desired signal is disclosed in Patent Literature 1, Non-Patent Literature 1, and Non-patent Literature 2. As described above, the m-th SFBC pair is transmitted using REs of the 2m-th and (2m+1)-th subcarriers.

If a receiving apparatus receives a wireless signal through two receiving antennas, the received signal corresponding to the REs of the 2m-th and (2m+1)-th subcarriers can be virtually regarded as a signal received through 2×4 MIMO channels. The term MIMO is the abbreviation for Multiple-Input And Multiple-Output. Accordingly, assuming that the number of interfering cells is one and a wireless signal transmitted in the interfering cell is subjected to the SFBC, the received signal can be expressed by Expression 9.

$$\begin{bmatrix} y_0(2m) \\ y_1(2m) \\ y_0^*(2m+1) \\ y_1^*(2m+1) \end{bmatrix} = \begin{bmatrix} h_{00}(2m) & h_{01}(2m) \\ h_{10}(2m) & h_{11}(2m) \\ h_{01}^*(2m+1) & -h_{00}^*(2m+1) \\ h_{11}^*(2m+1) & -h_{10}^*(2m+1) \end{bmatrix} \quad [\text{Expression 9}]$$

$$\begin{bmatrix} x_0(m) \\ -x_1^*(m) \end{bmatrix} + \begin{bmatrix} g_{00}(2m) & g_{01}(2m) \\ g_{10}(2m) & g_{11}(2m) \\ g_{01}^*(2m+1) & -g_{00}^*(2m+1) \\ g_{11}^*(2m+1) & -g_{10}^*(2m+1) \end{bmatrix}$$

$$\begin{bmatrix} s_0(m) \\ -s_1^*(m) \end{bmatrix} + \begin{bmatrix} n_0(2m) \\ n_1(2m) \\ n_0^*(2m+1) \\ n_1^*(2m+1) \end{bmatrix}$$

Here, an element $y_i(j)$ represents a received signal which is received by the i-th receiving antenna and which corresponds to an RE of the j-th subcarrier. The symbol i represents zero or one, and the symbol j represents an integer equal to or more than zero.

The matrix expressed by Expression 10 in Expression 9 represents virtual MIMO channels between the base station and the mobile station in the serving cell. The matrix expressed by Expression 11 in Expression 9 represents virtual MIMO channels between the base station and the mobile station in an interfering cell.

$$\begin{bmatrix} h_{00}(2m) & h_{01}(2m) \\ h_{10}(2m) & h_{11}(2m) \\ h_{01}^*(2m+1) & -h_{00}^*(2m+1) \\ h_{11}^*(2m+1) & -h_{10}^*(2m+1) \end{bmatrix} \quad [\text{Expression 10}]$$

$$\begin{bmatrix} g_{00}(2m) & g_{01}(2m) \\ g_{10}(2m) & g_{11}(2m) \\ g_{01}^*(2m+1) & -g_{00}^*(2m+1) \\ g_{11}^*(2m+1) & -g_{10}^*(2m+1) \end{bmatrix} \quad [\text{Expression 11}]$$

The vector expressed by Expression 12 in Expression 9 represents a desired signal transmitted from the base station to the mobile station in the serving cell. The vector expressed by Expression 13 in Expression 9 represents a wireless signal transmitted from the base station in the interfering cell. The vector expressed by Expression 14 in Expression 9 represents noise.

$$x = \begin{bmatrix} x_0(m) \\ -x_1^*(m) \end{bmatrix} \quad [\text{Expression 12}]$$

$$s = \begin{bmatrix} s_0(m) \\ -s_1^*(m) \end{bmatrix} \quad [\text{Expression 13}]$$

$$n = \begin{bmatrix} n_0(2m) \\ n_1(2m) \\ n_0^*(2m+1) \\ n_1^*(2m+1) \end{bmatrix} \quad [\text{Expression 14}]$$

Using Expressions 15 through 21, Expression 9 is expressed by Expression 22.

$$y = \begin{bmatrix} y_0(2m) \\ y_1(2m) \\ y_0^*(2m+1) \\ y_1^*(2m+1) \end{bmatrix} \quad [\text{Expression 15}]$$

$$H = \begin{bmatrix} H_0 \\ H_1 \end{bmatrix} \quad [\text{Expression 16}]$$

$$H_0 = \begin{bmatrix} h_{00}(2m) & h_{01}(2m) \\ h_{10}(2m) & h_{11}(2m) \end{bmatrix} \quad [\text{Expression 17}]$$

$$H_1 = \begin{bmatrix} h_{01}^*(2m+1) & -h_{00}^*(2m+1) \\ h_{11}^*(2m+1) & -h_{10}^*(2m+1) \end{bmatrix} \quad [\text{Expression 18}]$$

$$G = \begin{bmatrix} G_0 \\ G_1 \end{bmatrix} \quad [\text{Expression 19}]$$

$$G_0 = \begin{bmatrix} g_{00}(2m) & g_{01}(2m) \\ g_{10}(2m) & g_{11}(2m) \end{bmatrix} \quad [\text{Expression 20}]$$

$$G_1 = \begin{bmatrix} g_{01}^*(2m+1) & -g_{00}^*(2m+1) \\ g_{11}^*(2m+1) & -g_{10}^*(2m+1) \end{bmatrix} \quad [\text{Expression 21}]$$

$$y = \begin{bmatrix} H_0 \\ H_1 \end{bmatrix} x + \begin{bmatrix} G_0 \\ G_1 \end{bmatrix} s + n \quad [\text{Expression 22}]$$

From Expression 22, the interference noise $y_a$ is represented by Expression 23.

$$y_a = y - \begin{bmatrix} H_0 \\ H_1 \end{bmatrix} x = \begin{bmatrix} G_0 \\ G_1 \end{bmatrix} s + n \quad \text{[Expression 23]}$$

Using Expression 23 and Expressions 24-28, the covariance matrix $R_{I|N,ideal}^{(SFBC)}$ for interference noise is represented by Expression 29.

$$y_a = \begin{bmatrix} y_{a,0}(2m) \\ y_{a,1}(2m) \\ y_{a,0}^*(2m+1) \\ y_{a,1}^*(2m+1) \end{bmatrix} \quad \text{[Expression 24]}$$

$$R_{I+N}(2m) = \begin{bmatrix} E\{|y_{a,0}(2m)|^2\} & E\{y_{a,0}(2m)y_{a,1}^*(2m)\} \\ E\{y_{a,1}(2m)y_{a,0}^*(2m)\} & E\{|y_{a,1}(2m)|^2\} \end{bmatrix} \quad \text{[Expression 25]}$$

$$\{R_{I+N}(2m+1)\}^T = \begin{bmatrix} E\{|y_{a,0}(2m+1)|^2\} & E\{y_{a,0}^*(2m+1)y_{a,1}(2m+1)\} \\ E\{y_{a,1}^*(2m+1)y_{a,0}(2m+1)\} & E\{|y_{a,1}(2m+1)|^2\} \end{bmatrix} \quad \text{[Expression 26]}$$

$$R_{NDB1}(m) = \begin{bmatrix} 0 & E\{y_{a,0}^*(2m+1)y_{a,1}^*(2m)\} \\ E\{y_{a,1}^*(2m+1)y_{a,0}^*(2m)\} & 0 \end{bmatrix} \quad \text{[Expression 27]}$$

$$R_{NDB2}(m) = \begin{bmatrix} 0 & E\{y_{a,0}(2m)y_{a,1}(2m+1)\} \\ E\{y_{a,1}(2m)y_{a,0}(2m+1)\} & 0 \end{bmatrix} \quad \text{[Expression 28]}$$

$$R_{I+N,ideal}^{(SFBC)} = E\{y_a y_a^H\} = E\left\{ \begin{bmatrix} y_{a,0}(2m) \\ y_{a,1}(2m) \\ y_{a,0}^*(2m+1) \\ y_{a,1}^*(2m+1) \end{bmatrix} \begin{bmatrix} y_{a,0}^*(2m) & y_{a,1}^*(2m) & y_{a,0}(2m+1) & y_{a,1}(2m+1) \end{bmatrix} \right\} = E \quad \text{[Expression 29]}$$

$$= \left\{ \begin{bmatrix} |y_{a,0}(2m)|^2 & y_{a,0}(2m)y_{a,1}^*(2m) & y_{a,0}(2m)y_{a,0}(2m+1) & y_{a,0}(2m)y_{a,1}(2m+1) \\ y_{a,1}(2m)y_{a,0}^*(2m) & |y_{a,1}(2m)|^2 & y_{a,1}(2m)y_{a,0}(2m+1) & y_{a,1}(2m)y_{a,1}(2m+) \\ y_{a,0}^*(2m+1)y_{a,0}^*(2m) & y_{a,0}^*(2m+1)y_{a,1}^*(2m) & |y_{a,0}(2m+1)|^2 & y_{a,0}^*(2m+1)y_{a,1}(2m+1) \\ y_{a,1}^*(2m+1)y_{a,0}^*(2m) & y_{a,1}^*(2m+1)y_{a,1}^*(2m) & y_{a,1}^*(2m+1)y_{a,0}(2M+1) & |y_{a,1}(2m+1)|^2 \end{bmatrix} \right\} =$$

$$= \begin{bmatrix} R_{I+N}(2m) & 0 & E\{y_{a,0}^*(2m+1)y_{a,1}^*(2m)\} \\ 0 & E\{y_{a,0}^*(2m+1)y_{a,1}^*(2m)\} & \{y_{a,1}^*(2m+1)y_{a,0}^*(2m)\} & 0 \\ 0 & E\{y_{a,0}^*(2m+1)y_{a,1}^*(2m)\} & (R_{I+N}(2m+1))^T \\ E\{y_{a,1}^*(2m+1)y_{a,0}^*(2m)\} & 0 & \end{bmatrix} =$$

$$\begin{bmatrix} R_{I+N}(2m) & R_{NDB2}(m) \\ R_{NDB1}(m) & (R_{I+N}(2m+1))^T \end{bmatrix}$$

The submatrices expressed by Expressions 25 and 26 are also referred to as diagonal block matrices while the submatrices expressed by Expressions 27 and 28 are also referred to as non-diagonal block matrices.

A non-diagonal component of each non-diagonal block matrix represents a covariance between interfering noises different in subcarrier and also different in receiving antenna.

Figure 2:
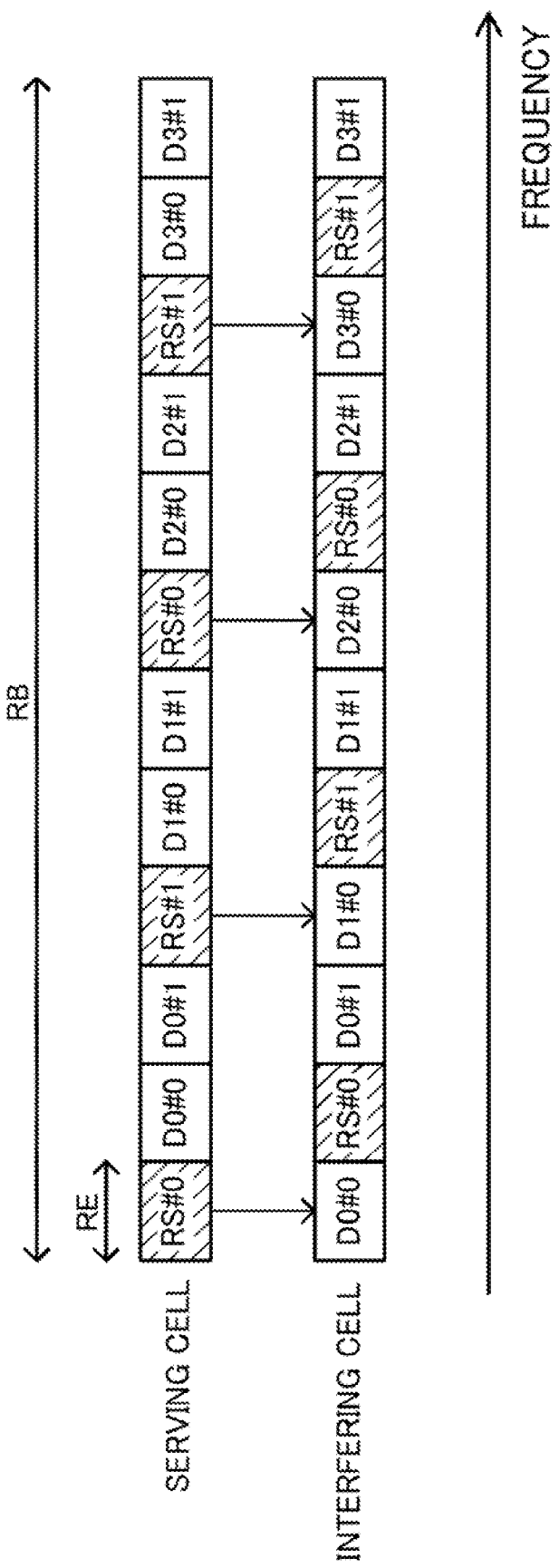
FIG. 2 is a diagram illustrating an example of allocation of a wireless resource to a reference signal and a coded signal.

As illustrated in FIG. 2, in each of the serving cell and the interfering cell, the reference signal is allocated to every three REs along the frequency axis. An RS#i in FIG. 2 represents a reference signal transmitted through the i-th transmitting antenna. The symbol i represents zero or one.

The term Dj#i in FIG. 2 represents the i-th coded signal in the j-th SFBC pair. Here, the symbol j represents an integer equal to or more than zero. Furthermore, as illustrated in FIG. 2, a reference signal is allocated to REs of subcarriers different with multiple wireless areas.

As illustrated in FIG. 2, among six REs having successive frequencies, the j-th and (j+1)-th SFBC pairs are allocated to the remaining four REs except for two REs allocated thereto the reference signal. For example, in the ascending order of the frequencies, the 0th coded signal of the j-th SFBC pair, the first coded signal of the j-th SFBC pair, the 0th coded signal of the (j+1)-th SFBC pair, and the first coded signal of the (j+1)-th SFBC pair are allocated to the remaining four REs.

Accordingly, in the example of FIG. 2, to an RE allocated thereto the reference signal in the serving cell, the 0th coded signal is allocated in the interfering cell. In other words, to the REs allocated thereto an SFBC pair in the interfering cell, the coded signal and the reference signal are allocated in the serving cell. For the above, it is difficult to estimate a highly precise covariance based on the received signal corresponding to REs, which are allocated to the SFBC pair in the interfering cell. For example, a method of subtracting a replica signal from the received signal has difficulty in estimating the covariance being satisfactory precise.

For the above, the IRC process disclosed in Patent Literature 1, Non-Patent Literature 1, and Non-Patent Literature 2 estimates the value $R_{e,I+N}^{(SFBC)}$ of a covariance matrix for interference noise by setting the non-diagonal components in the non-diagonal block matrix to zero, as represented by Expression 30, and then processes the received signal using the estimated value $R_{e,I+N}^{(SFBC)}$ of the covariance matrix.

$$R_{e,I+N}^{(SFBC)} = \begin{bmatrix} R_{e,I+N} & 0 \\ 0 & R_{e,I+N}^T \end{bmatrix}$$ [Expression 30]

Unfortunately, the IPC process disclosed in Patent Literature 1, Non-Patent Literature 1, and Non-Patent Literature 2 has difficulty in reflecting actual communication state in the processing of the received signal. Consequently, the quality of the wireless communication tends to be degraded.

Hereinafter, the embodiments of the present disclosure will now be described with reference to the accompanying drawings. The following embodiments are exemplary, so there is no intention to exclude application of various modifications and techniques not suggested in the following description to the embodiments. Throughout accompanying drawings of the embodiments, like reference numbers designate the same or substantially identical parts or elements.

First Embodiment

Configuration

Figure 3:
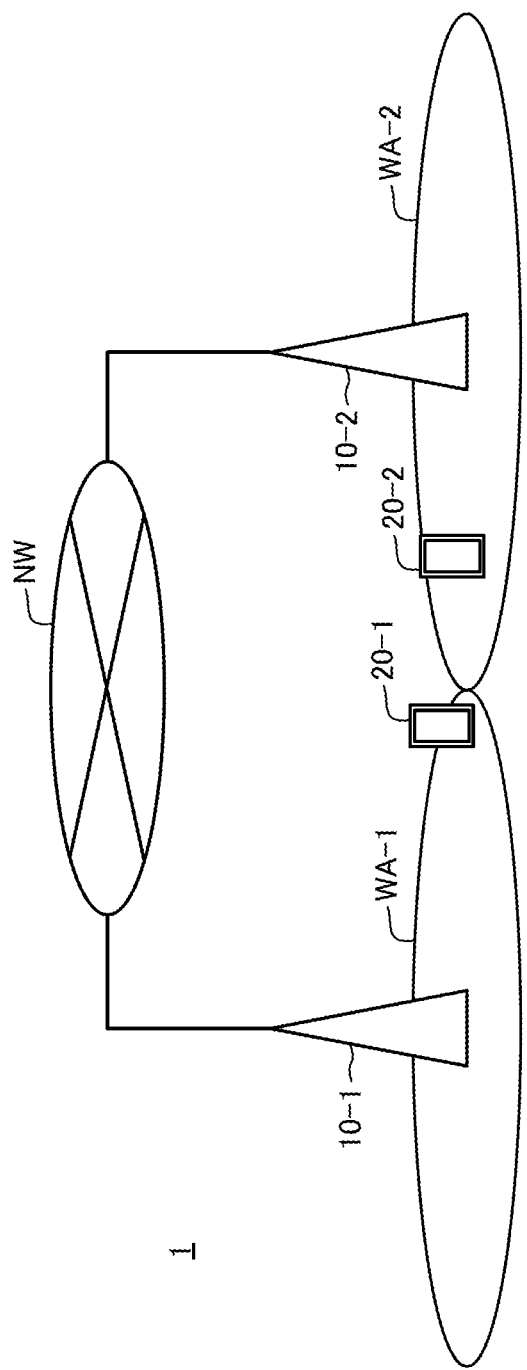
FIG. 3 is a block diagram schematically illustrating an example of the configuration of a wireless communication system according to a first embodiment.

As illustrated in FIG. 3, the wireless communication system 1 according to a first embodiment includes L base stations 10-1, . . . , 10-L and M mobile stations 20-1, . . . , 20-M. The symbols L and M represent integers equal to or more than one. The example of FIG. 3 assumes that L represents two and M represents two.

Hereinafter, not discriminating a base station 10-i from the remaining base stations, the base station 10-i is sometimes simply represented by the base station 10. Here, the symbol i represents an integer between 1 and L. Likewise, not discriminating a mobile station 20-j from the remaining mobile stations, the mobile station 20-j is sometimes simply represented by the mobile station 20. The symbol j represents an integer between 1 and M.

A base station 10 is an example of a transmitting apparatus while the mobile station 20 is an example of a receiving apparatus.

The wireless communication system 1 carries out wireless communication between the base stations 10 and the mobile stations 20 in a certain wireless communication scheme. Examples of the wireless communication scheme is Long Term Evolution (LTE), LTE-Advanced, and Worldwide Interoperability for Microwave Access (WiMAX).

In this embodiment, the base station 10-i forms a wireless area WA-i. If not discriminating the wireless area WA-i from the remaining wireless areas, the wireless area WA-i is sometimes represented by the wireless area WA. Each bases station 10 may form multiple wireless areas WA. A wireless area WA may be also referred to as a coverage area or a communication region. Examples of a wireless area WA are a macrocell, a microcell, a nanocell, a picocell, a femtocell, a home cell, and a sector cell. Each base station 10 wirelessly communicates with a mobile station 20 being positioned in the wireless area WA that the base station 10 forms.

For example, each base station 10 provides a wireless resource in the wireless area WA that the base station 10 forms. For example, the wireless resource is identified by a time and a frequency. Each base station 10 communicates with a mobile station 20 being positioned in the wireless area WA that the base station 10 forms by using the wireless resource that the base station 10 provides in the wireless area WA. Examples of each base station 10 are an access point, an Evolved Node B (eNB), a Node B (NB), a femto base station, a macro base station, and a home base station.

In the first embodiment, the mobile station 20-1 is positioned in a wireless area WA-1 that the base station 10-1 forms; and the mobile station 20-2 is positioned in a wireless area WA-2 that the base station 10-2 forms. The wireless area WA-1 is an example of a first wireless area and the wireless area WA-2 is an example of a second wireless area.

In the first embodiment, each base station 10 is wired-communicably connected to a communication network (e.g., core network) NW via a communication line. Alternatively, each base station 10 may be wirelessly-communicably connected to the communication network NW. An interface between each base station 10 and the communication network NW may be called an S1 interface. An interface between the base stations 10 may be called an X2 interface.

A part of the wireless communication system 1 including entities closer to the communication network (in other words, the part having an upper level) than the base stations 10 may be referred to as an EPC, which is an abbreviation for Evolved Packet Core. A part of the wireless communication system 1 formed by the base stations 10 may be referred to as an E-UTRAN, which is an abbreviation for Evolved Universal Terrestrial Radio Access Network.

A mobile station 20 wirelessly communicates with a base station 10 that forms the wireless area WA in which the mobile station 20 is positioned using the wireless resource provided in the wireless area WA. A mobile station 20 may also be called a wireless terminal, a terminal device, and user equipment (UE).

In this embodiment, a wireless area WA accommodating a mobile station 20 is also called a serving cell. For example, positioning a mobile station 20 in a wireless area WA means that the mobile station 20 is connected to the base station 10 that forms the wireless area WA such that the mobile station 20 can send and receive data to and from the base station 10 using the wireless resource provided in the wireless area WA.

In this embodiment, a wireless area WA except for the wireless area WA accommodating a mobile station 20 is also called an interfering cell.

(Configuration: Base Station)

Figure 4:
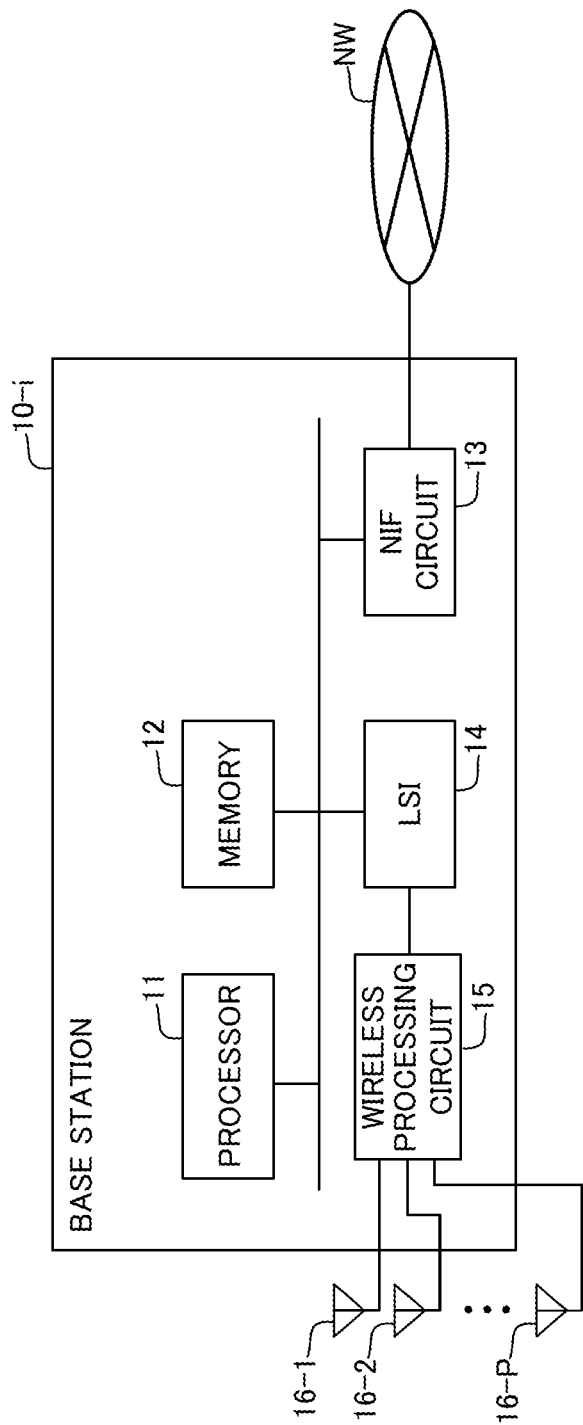
FIG. 4 is a block diagram schematically illustrating an example of the configuration of a base station of FIG. 3.

As illustrated in FIG. 4, a base station 10-i exemplarily includes a processor 11, a memory 12, an NIF circuit 13, an LSI 14, a wireless processing circuit 15, and P antennas 16-1, . . . , 16-P. In this embodiment, the symbol P represents an integer equal to or more than two. The term NIF is an abbreviation for Network Interface and the term LSI is an abbreviation for Large Scale Integration.

The processor 11 controls the operation of the base station 10-i by executing a program stored in the memory 12.

The NIF circuit 13 receives data that is to be transmitted to a mobile station 20 from the communication network NW and transmits data received from a mobile station 20 to the communication network NW. In addition, the NIF circuit 13 sends and receives control information to and from the communication network NW. For example, the control information may include information to identify another base station 10 that forms a wireless area WA different from the wireless area WA that the relevant base station 10.

The LSI 14 processes a digital signal for accomplishing wireless communication. The LSI 14 may be replaced by a programmable logical circuit device such as a Programmable Logic Device (PLD) or a Field-Programmable Gate Array (FPGA).

The wireless processing circuit 15 carries out wireless communication through the antennas 16-1, . . . , 16-P.

The detailed functions of the LSI 14 and the wireless processing circuit 15 will be described below.

(Configuration: Mobile Station)

Figure 5:
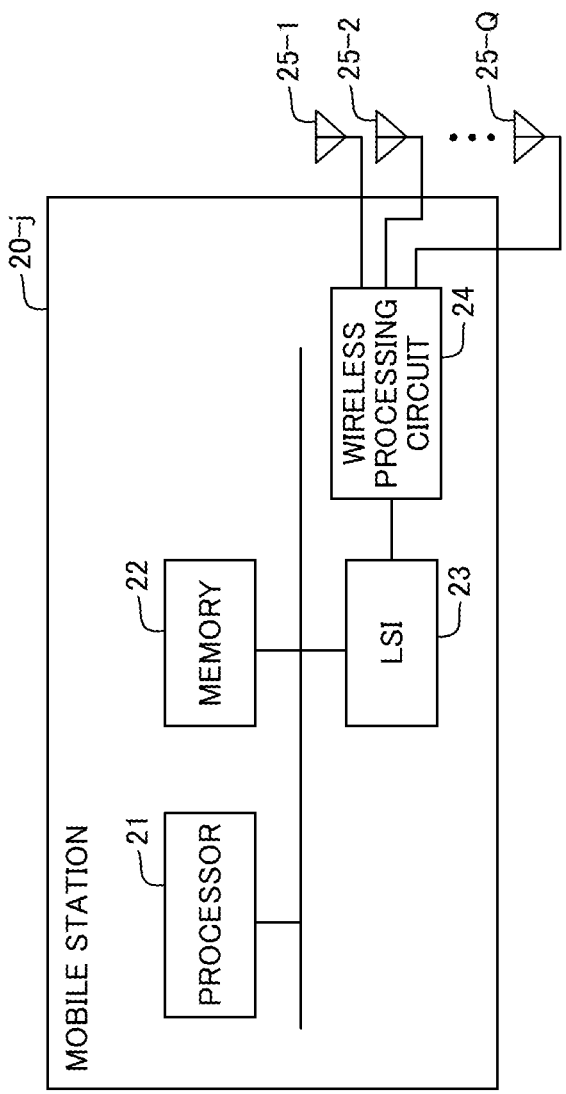
FIG. 5 is a block diagram schematically illustrating an example of the configuration of a mobile station of FIG. 3.

As illustrated in FIG. 5, a mobile station 20-j exemplarily includes a processor 21, a memory 22, an LSI 23, a wireless processing circuit 24, and Q antennas 25-1, . . . , 25-Q. In this example, the symbol Q represents an integer equal to or more than two.

The processor 21 controls the operation of the mobile station 20-j by executing a program stored in the memory 22.

The LSI 23 processes a digital signal for accomplishing wireless communication. The LSI 23 may be replaced by a programmable logical circuit device such as a PLD or an FPGA.

The wireless processing circuit 24 carries out wireless communication through the antennas 25-1, . . . , 25-Q.

The detailed functions of the LSI 23 and the wireless processing circuit 24 will be detailed below.

(Function: Base Station)

Figure 6:
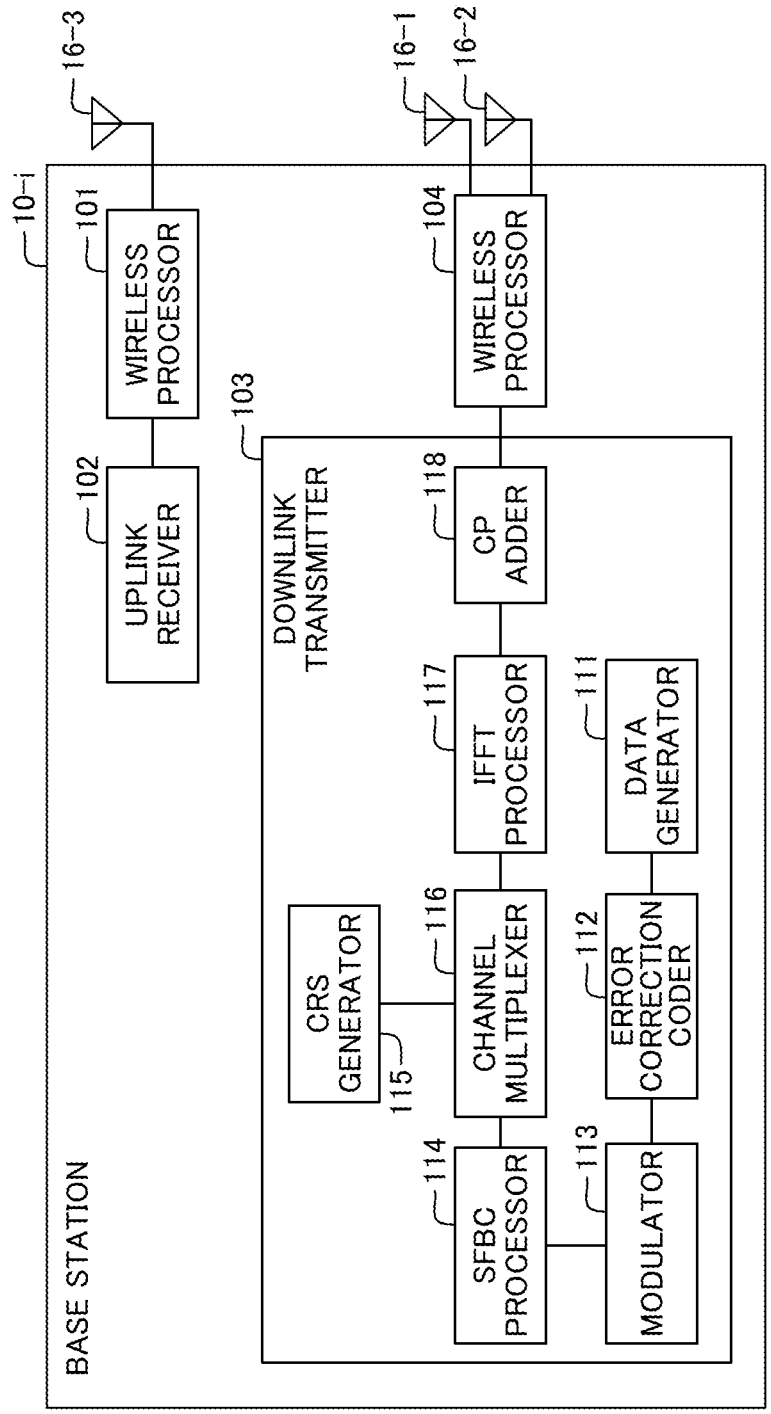
FIG. 6 is a block diagram schematically illustrating an example of the function of a base station of FIG. 3.

As illustrated in FIG. 6, the functions of the LSI 14 and the wireless processing circuit 15 of the base station 10-i exemplarily include a wireless processor 101, an uplink receiver 102, a downlink transmitter 103, and a wireless processor 104. The downlink transmitter 103 and the wireless processor 104 collectively serve as an example of a transmitter.

In this embodiment, the wireless processor 101 receives wireless signals through a single antenna 16-3. Alternatively, the wireless processor 101 may receive wireless signals through multiple antennas 16-1, . . . , 16-P.

The wireless processor 101 carries out frequency conversion (here down-conversion) from a wireless frequency band to a baseband on a wireless signal received through the antenna 16-3, and then performs Analog to Digital (A/D) conversion on the signal obtained by the frequency conversion.

The uplink receiver 102 processes the signal output from the wireless processor 101. The process performed by the uplink receiver 102 includes, for example, demodulation and error correction decoding.

In the above manner, the wireless processor 101 and uplink receiver 102 receive an uplink signal transmitted from the mobile station 20.

The downlink transmitter 103 exemplarily includes a data generator 111, an error correction coder 112, a modulator 113, an SFBC processor 114, a CRS generator 115, a channel multiplexer 116, an IFFT processor 117, and a CP adder 118. The term CRS is an abbreviation for Cell-Specific Reference Signal; the term IFFT is an abbreviation for Inverse Fast Fourier Transform; and the term CP is an abbreviation for Cyclic Prefix.

The data generator 111 generates data destined for a mobile station 20.

The error correction coder 112 carries out error correction coding on the data generated by the data generator 111. An example of an error correction code used by the error correction coder 112 is a Turbo code. Alternatively, the error correction code may be a Reed-Solomon code or a convolutional code.

The modulator 113 modulates data obtained by the coding in the error correction coder 112. The modulating here is carried out in conformity with, for example, a multi-value modulation scheme such as Quadriphase Phase-Shift Keying (QPSK), 16 Quadrature Amplitude Modulation (QAM), and 64 QAM. In this embodiment, the modulator 113 outputs a modulation symbol as the data obtained by the modulating.

The SFBC processor 114 carries out SFBC on the modulation symbol output from the modulator 113. In this embodiment, the SFBC processor 114 generates an SFBC pair for each set of two modulation symbols, so that the SFBC pair corresponds to the two modulation symbols. An SFBC pair is an example of a pair of coded signals, being coded in Alamouti-type coding.

For example, the SFBC processor 114 generates, from a first modulation symbol $x_0$ and a second modulation symbol $x_1$, a first coded signal and a second coded signal as an SFBC pair. The first coded signal includes a first transmission symbol $x_0$ transmitted from the zeroth transmitting antenna and a second transmission symbol $-x_1^*$ transmitted from the first transmitting antenna. Here, the term X* represents the complex conjugate of X. Likewise, the second coded signal includes a third transmission symbol $x_1$ transmitted from the zeroth transmitting antenna and a fourth transmission symbol $x_0^*$ transmitted from the first transmitting antenna.

The CRS generator 115 generates a reference signal (CRS) by which a cell is identified. A CRS is an example of a known reference signal. In this embodiment, the base station 10 and the mobile station 20 know the reference signal in advance. For example, each of the base station 10 and the mobile station 20 may retain the reference signal in advance or may generate the reference signal.

The channel multiplexer 116 multiplexes data destined for a mobile station 20 and a reference signal. In the first embodiment, the channel multiplexer 116 multiplexes an SFBC pair generated by the SFBC processor 114 and a CRS generated by the CRS generator 115.

Figure 7:
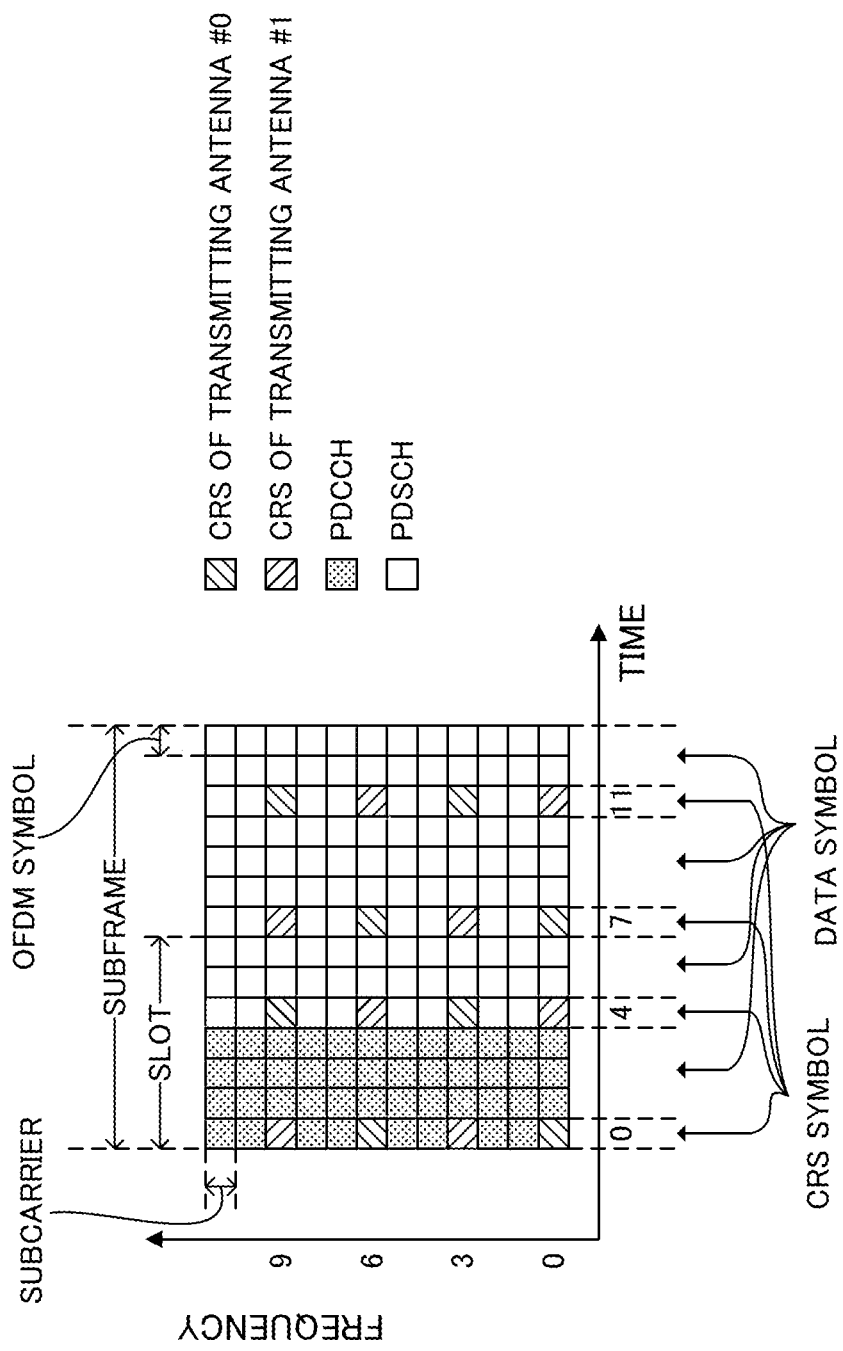
FIG. 7 is a diagram illustrating an example of allocation of a wireless resource in downlink communication conforming to the LTE scheme.

Description will now be made in relation to a manner of multiplexing an SFBC pair and a CRS. FIG. 7 illustrates an example of allocation of a wireless resource in downlink communication in conformity with the LTE scheme. The example of FIG. 7 assumes that Normal CP is used and the number of transmitting antennas is two. Alternatively, the manner of allocation of a wireless resource may be different from that of FIG. 7.

A wireless resource is identified by a time and a frequency. A wireless resource corresponding to a single OFDM symbol time of a single OFDM subcarrier is called a resource element (RE). In other words, a wireless resource includes multiple REs having different combinations of a time and a frequency. In the first embodiment, a time period corresponding to seven REs successive along the time axis is called a slot; and two slots successive along the time axis constitute a single subframe.

In this embodiment, among REs contained in a single slot along the time axis, REs corresponding to 12 subcarriers successive along the frequency axis constitute a unit called a resource block (RB). Accordingly, a single RB of this embodiment consists of 84 (=12×7) REs.

As illustrated in FIG. 7, among the REs of the zeroth and the sixth subcarriers, the REs of the zeroth symbol time are allocated to CRSs transmitted from the zeroth transmitting antenna. The l-th symbol time corresponds to the time of the l-th OFDM symbol along the time axis. Among the REs contained in the third and the ninth subcarriers, the REs of the zeroth symbol time are allocated to CRSs transmitted from the first transmitting antenna.

Among the REs contained in the zeroth and the sixth subcarriers, the REs of the fourth symbol time are allocated to CRSs transmitted from the first transmitting antenna. Among the REs contained in the third and the ninth subcarriers, the REs of the fourth symbol time are allocated to CRSs transmitted from the zeroth transmitting antenna.

Among the REs of from the zeroth to the third symbol time from the front position of the subframe, REs different from REs allocated to CRSs are allocated to a Physical Downlink Control Channel (PDCCH). The PDCCH is an example of a control channel, through which the control information is carried.

Among the REs contained in the two RBs illustrated in FIG. 7, REs different from REs allocated to the PDCCH or the CRSs are allocated to a Physical Downlink Shared Channel (PDSCH). The PDSCH is an example of a data channel, through which data destined for a mobile station 20 is carried.

A group of REs of the same symbol times as the REs allocated to CRSs is also referred to as a CRS symbol while a group of REs of different symbol times from the REs allocated to CRSs is also referred to as a data symbol.

Next, description will now be made in relation to allocation of a wireless resource to an SFBC pair.

Figure 8:
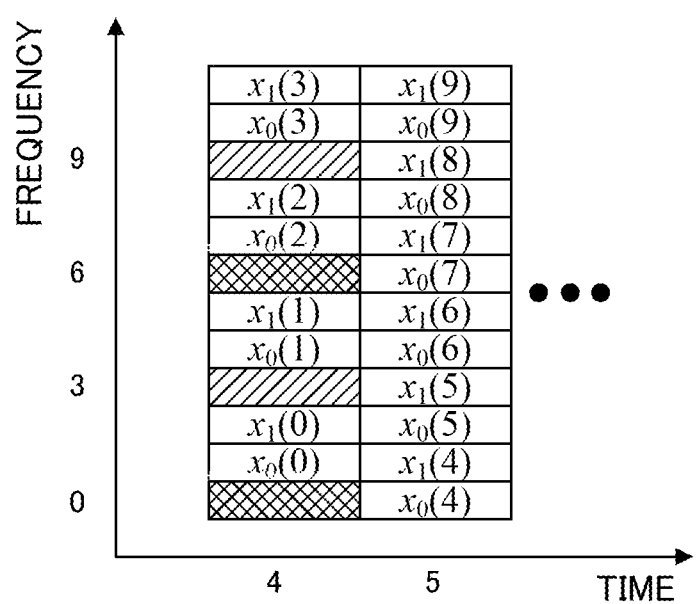
FIG. 8 is a diagram illustrating an example of allocation of a wireless resource to a reference signal and a coded signal.
Figure 9:
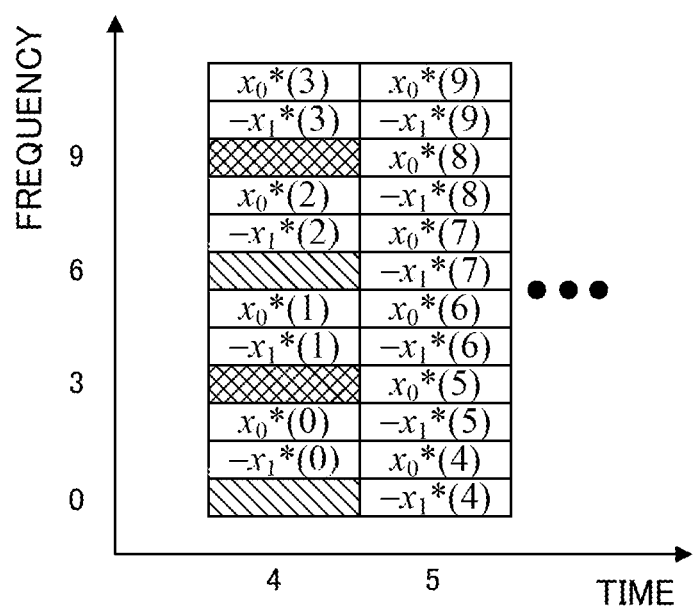
FIG. 9 is a diagram illustrating an example of allocation of a wireless resource to a reference signal and a coded signal.

FIGS. 8 and 9 illustrate an example in which a single RB is allocated to multiple SFBC pairs and allocation of a wireless resource to an SFBC pair starts from the REs of the fourth symbol time. FIGS. 8 and 9 illustrate an example of allocation of a wireless resource to the zeroth and the first transmitting antennas. The manner of allocation of a wireless resource may be different from the example of FIGS. 8 and 9.

In this embodiment, REs allocated to the PDSCH are sequentially allocated to the SFBC pairs along the frequency axis. For example, in this embodiment, the transmission symbol contained in the first coded signal of the m-th SFBC pair and the transmission symbol contained in the second coded signal of the m-th SFBC pair are allocated to the two REs successive along the frequency axis in the ascending order of the frequencies.

For example, the transmission symbol $x_0(0)$ contained in the first coded signal of the zeroth SFBC pair is allocated to the RE of the first subcarrier among the REs of the fourth symbol time for the zeroth transmitting antenna. Furthermore, to the same RE, the transmission symbol $-x_1^*(0)$ contained in the first coded signal of the zeroth SFBC pair is allocated for the first transmitting antenna.

In addition, the transmission symbol $x_1(0)$ contained in the second coded signal of the zeroth SFBC pair is allocated to the RE of the second subcarrier among the REs of the fourth symbol time for the zeroth transmitting antenna. Furthermore, to the same RE, the transmission symbol $x_0^*(0)$ contained in the second coded signal of the zeroth SFBC pair is allocated for the first transmitting antenna.

As the above, each for the zeroth and the first transmission antennas, 2M REs are allocated to M SFBC pairs. Here, the symbol M represents an integer equal to or larger than one.

The IFFT processor 117 of FIG. 6 performs inverse Fourier transform (IFFT) on the signal obtained by the multiplexing by the channel multiplexer 116.

The CP adder 118 adds a CP to the signal obtained by the IFFT by the IFFT processor 117 and thereby generates an OFDM symbol.

The wireless processor 104 performs Digital to Analog (D/A) conversion on the signal output from the downlink transmitter 103. The wireless processor 104 carries out frequency conversion (here, up-conversion) from a baseband to a wireless frequency band on the signal obtained by the D/A conversion. The wireless processor 104 transmits the signal obtained by the frequency conversion through the antennas 16-1 and 16-2. The antenna 16-1 is an example of the zeroth transmitting antenna (transmitting antenna #0) and the antenna 16-2 is an example of the first transmitting antenna (transmitting antenna #1).

The wireless processor 101 and the wireless processor 104 may share at least one antenna among the multiple antennas 16-1, . . . , 16-P.

(Function: Mobile Station)

Figure 10:
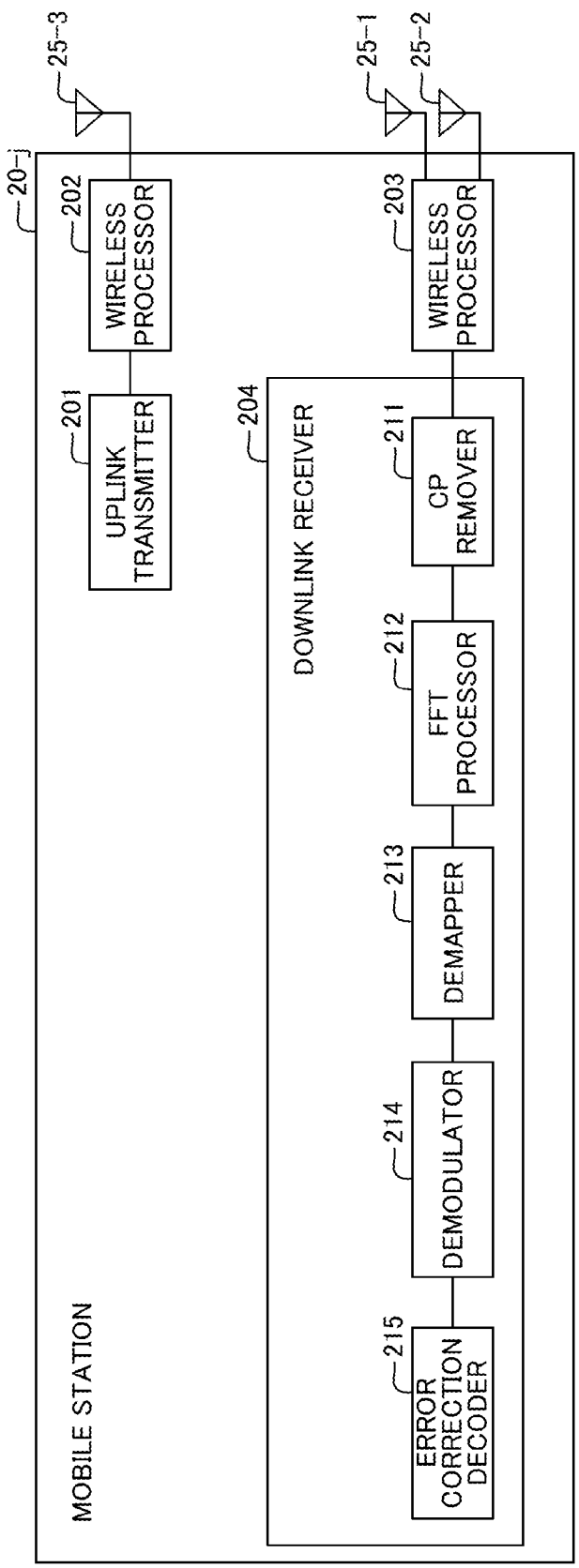
FIG. 10 is a block diagram schematically illustrating an example of the function of a mobile station of FIG. 3.

As illustrated in FIG. 10, the functions of the LSI 23 and the wireless processing circuit 24 of the mobile station 20-j exemplarily include an uplink transmitter 201, a wireless processor 202, a wireless processor 203, and a downlink receiver 204. The wireless processor 203 is an example of a receiver. The downlink receiver 204 is an example of a processor.

The uplink transmitter 201 generates data destined for a base station 10, performs error correction coding on the generated data, and modulates the data obtained by the coding.

The wireless processor 202 performs D/A conversion on the signal obtained through the modulation by the uplink transmitter 201. The wireless processor 202 carries out frequency conversion (here, up-conversion) from a baseband to a wireless frequency band on the signal obtained by the D/A conversion. The wireless processor 202 transmits the signal obtained by the frequency conversion through the antenna 25-3. Alternatively, the wireless processor 202 may transmit the wireless signal through multiple antennas 25-1, . . . , 25-Q.

Along the above procedure, the uplink transmitter 201 and the wireless processor 202 transmit an uplink signal to a base station 10.

In this embodiment, the wireless processor 203 receives wireless signal through two antennas 25-1 and 25-2. Alternatively, the wireless processor 203 may receive a wireless signal through three or more antennas 25-1, . . . , 25-Q. The antenna 25-1 is an example of the zeroth receiving antenna or the first antenna while the antenna 25-2 is an example of the first receiving antenna or the second antenna.

The wireless processor 202 and the wireless processor 203 may share at least one antenna of the multiple antennas 25-1, . . . , 25-Q.

The wireless processor 203 performs frequency conversion (here, down-conversion) from a wireless frequency band to the baseband on a wireless signal received through the antennas 25-1 and 25-2. The wireless processor 203 performs A/D conversion on the signal obtained by the frequency conversion.

The downlink receiver 204 processes the signal output from the wireless processor 203. The process of the downlink receiver 204 includes, for example, demodulation and error correction decoding.

The downlink receiver 204 exemplarily includes a CP remover 211, an FFT processor 212, a demapper 213, a demodulator 214, and an error correction decoder 215. The FFT is an abbreviation for Fast Fourier Transform.

The CP remover 211 removes the CP from the signal output from the wireless processor 203. The FFT processor 212 carries out Fast Fourier Transform (FFT) on the signal obtained by removal of the CP. The demapper 213 demaps the signal obtained by the FFT performed by the FFT processor 212. For example, demapping may include a process of extracting a component for each channel or each RE from the signal obtained by the FFT.

The demodulator 214 demodulates the signal obtained through demapping by the demapper 213. The signal input into the demodulator 214 is an example of a received wireless signal. The demodulator 214 will be further detailed below. The error correction decoder 215 performs error correction decoding on the signal obtained by the demodulating of the demodulator 214.

Along the above procedure, the downlink receiver 204 regenerates the data transmitted from the base station 10.

Here, the demodulator 214 will now be detailed.

Figure 11:
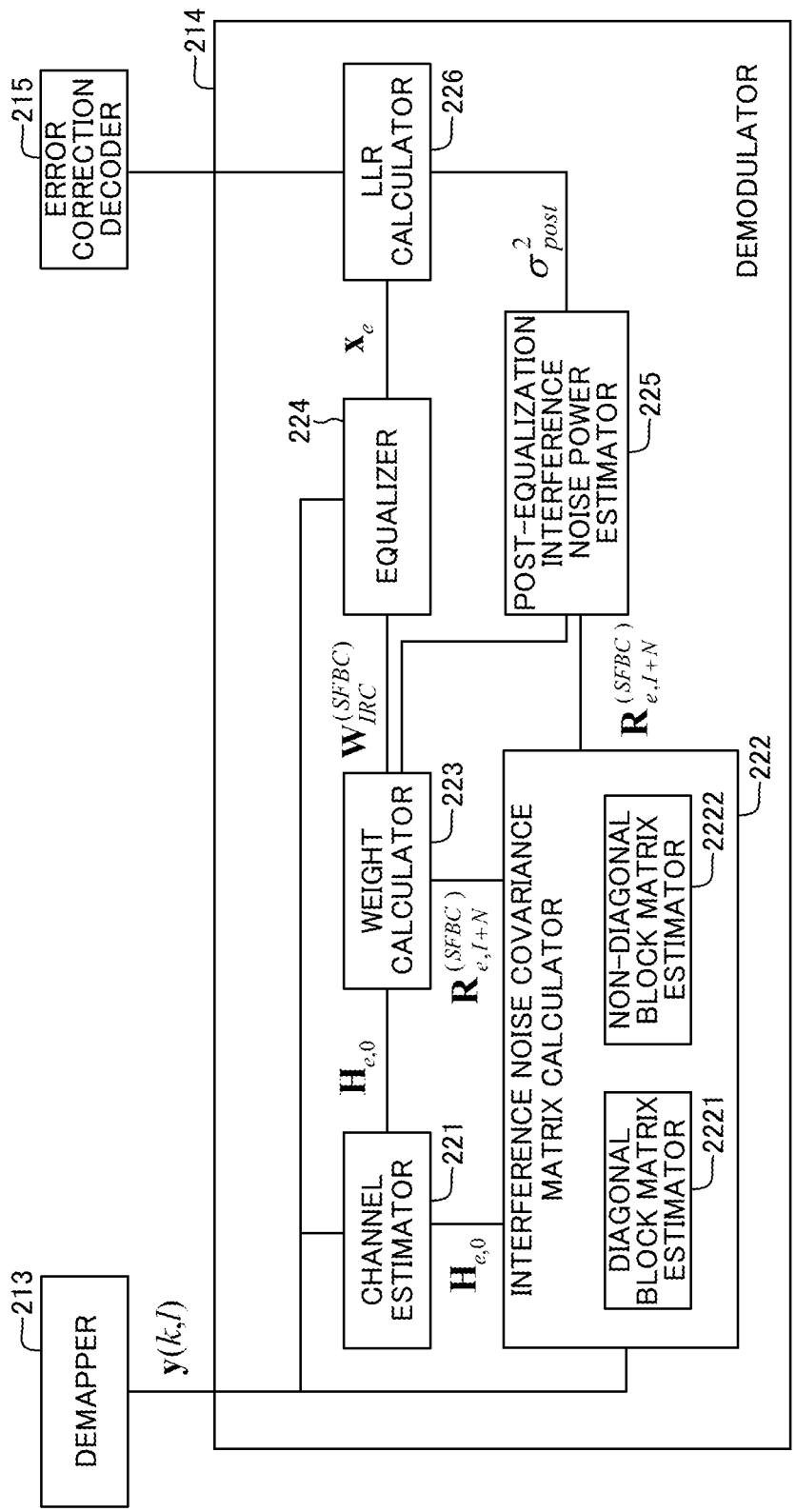
FIG. 11 is a block diagram schematically illustrating an example of the function of a demodulator of FIG. 10.

As illustrated in FIG. 11, the demodulator 214 exemplarily includes a channel estimator 221, an interference noise covariance matrix calculator 222, a weight calculator 223, an equalizer 224, a post-equalization interference noise power estimator 225, and an LLR calculator 226. The term LLR is an abbreviation for Log Likelihood Ratio.

The channel estimator 221 estimates a channel by using CRSs. An estimated value of a channel matrix of the RE of the l-th symbol time among the REs of the k-th subcarrier is expressed by Expression 31. An estimated value $H_{e,0}(k, l)$ of a channel matrix is also referred to as a channel estimated value.

$$H_{e,0}(k, l) = \begin{bmatrix} h_{e,00}(k, l) & h_{e,01}(k, l) \\ h_{e,10}(k, l) & h_{e,11}(k, l) \end{bmatrix}$$ [Expression 31]

Here, the element $h_{e,uv}(k, l)$ represents an estimated value of a channel between the u-th transmitting antenna and the v-th receiving antenna. The each of symbols u and v represents zero or one.

The interference noise covariance matrix calculator 222 calculates a covariance matrix $R_{e,I+N}^{(SFBC)}(\kappa_0(m), \tau_0(m))$ for interference noise by using Expression 32. Interference noise includes interfering wave and noise, and is a component different from a component derived from a desired signal in the received wireless signal. In this embodiment, a desired signal is a wireless signal transmitted in the serving cell. Interference noise is an example of an undesired wave signal component contained in a received wireless signal.

Here, the symbols $\kappa_0(m)$ and $\tau_0(m)$ represent the subcarrier number and the symbol time number of the RE to which the first coded signal of the m-th SFBC pair is allocated, respectively. As described above, in this embodiment, the first coded signal of the m-th SFBC pair is $x_0(m)$ for the zeroth transmitting antenna and $-x_1^*(m)$ for the first transmitting antenna.

Here, the elements $R_{e,I+N}$ and $R_{e,I+N}^T$ represent diagonal block matrices, and a matrix $X^T$ represents the transposed matrix of a matrix X. In this embodiment, a diagonal block matrix is a block matrix containing the diagonal component of the covariance matrix. The portion different from the diagonal block matrix in the covariance matrix is called non-diagonal block matrix. In this embodiment, the non-diagonal block matrix is a matrix not containing the diagonal components in the covariance matrix.

In this embodiment, the interference noise covariance matrix calculator 222 includes a diagonal block matrix estimator 2221 that estimates a diagonal block matrix and a non-diagonal block matrix estimator 2222 that estimates a non-diagonal block matrix.

The diagonal block matrix estimator 2221 estimates a diagonal block matrix $R_{e,I+N}$ based on the received wireless signal y input into the demodulator 214 and the channel estimated value $H_{e,0}$ estimated by the channel estimator 221 using Expression 33.

$$R_{e,I+N} = E[(y(k,l) - H_{e,0}(k,l))(y(k,l) - H_{e,0}(k,l)x_{RS}(k,l))^H]$$ [Expression 33]

Here, the term $x_{RS}(k, l)$ represents a reference signal (CRS in this embodiment), which is retained by the mobile station 20-j in advance.

The symbols k and l represent the subcarrier number and the symbol time number of an RE included in an RE group that forms a certain target range, respectively.

In this embodiment, the target range corresponds to an RE group to which CRSs are allocated among REs included in a single RB. In this embodiment, the diagonal block matrix estimator 2221 estimates a diagonal block matrix for each RB.

The first diagonal component in the diagonal block matrix represents the variance of interference noise on one of a pair of coded signals received by the zeroth receiving antenna while the second component in the diagonal block matrix represents the variance of interference noise on one of a pair of coded signals received by the first receiving antenna. For example, the element of the first row and the first column in the covariance matrix represents the variance of interference noise on the first coded signal of a pair of coded signals received by the zeroth receiving antenna; and the element of the second row and the second column in the covariance matrix represents the variance of interference noise on the first coded signal of a pair of coded signals received by the first receiving antenna.

Alternatively, the diagonal block matrix estimator 2221 may use the RE group, to which CRSs are allocated among REs included in multiple RBs, as the target range or may use the RE group, to which CRSs are allocated among the REs included in the entire system bandwidth, as the target range. The diagonal block matrix estimator 2221 may use any target range. The diagonal block matrix estimator 2221 may adaptively change the target range on the basis of information that indicates the state of communication, such as Doppler frequency or delay spread.

$$R_{e,I+N}^{(SFBC)}(\kappa_0(m), \tau_0(m)) =$$ [Expression 32]

$$\begin{bmatrix} R_{e,I+N} & & 0 & \rho'^*(\kappa_0(m), \tau_0(m)) \\ & & -\rho'^*(\kappa_0(m), \tau_0(m)) & 0 \\ 0 & -\rho'^*(\kappa_0(m), \tau_0(m)) & & \\ \rho'^*(\kappa_0(m), \tau_0(m)) & 0 & & R_{e,I+N}^T \end{bmatrix}$$

In this embodiment, the diagonal block matrix estimator 2221 calculates a replica signal $H_{e,0}(k, l)x_{RS}(k, l)$ corresponding to the product of a channel estimated value $H_{e,0}(k, l)$ and the reference signal $x_{RS}(k, l)$ for each combination of k and l. Furthermore, the diagonal block matrix estimator 2221 calculates the product of a signal obtained by subtracting the replica signal $H_{e,0}(k, l)x_{RS}(k, l)$ from the received wireless signal $y(k, l)$ and the Hermitian conjugate of the signal obtained by the subtraction for each combination of k and l. Furthermore, the diagonal block matrix estimator 2221 averages the calculated products over the target range and thereby estimates the diagonal block matrix.

The replica signal $H_{e,0}(k, l)x_{RS}(k, l)$ may be an estimated value of a component derived from a reference signal $x_{RS}(k, l)$ in the serving cell contained in the received wireless signal $y(k, l)$.

In this embodiment, the diagonal block matrix estimator 2221 estimates a diagonal block matrix based on a signal obtained by subtracting the replica signal $H_{e,0}(k, l)x_{RS}(k, l)$ from the received wireless signal $y(k, l)$. This can estimate a highly precise diagonal block matrix.

The non-diagonal block matrix estimator 2222 estimates a non-diagonal block matrix based on the received wireless signal y input into the demodulator 214 and the channel estimated value $H_{e,0}$ estimated by the channel estimator 221 using Expressions 34 and 35.

$$\rho'(\kappa_0(m),\tau_0(m))=\rho-det(H_{e,0}(\kappa_0(m),\tau_0(m)))/2 \quad \text{[Expression 34]}$$

$$\rho=(E\{y_0(2q,l)y_1(2q+1,l)\}-E\{y_1(2q,l)y_0(2q+1,l)\})/2 \quad \text{[Expression 35]}$$

The terms $y_0$ and $y_1$ represent received wireless signals received by the zeroth and the first receiving antennas, respectively.

The terms 2q and l represent the subcarrier number and the symbol time number of an RE included in the RE group that forms a certain target range, respectively. Likewise, the terms 2q+1 and l represent the subcarrier number and the symbol time number of an RE included in the RE group that forms the same target range, respectively.

In this embodiment, the target range is an RE group consisting of REs allocated thereto the first coded signal and the second coded signal in a data symbol among REs contained in a single RB. In this embodiment, the non-diagonal block matrix estimator 2222 estimates a non-diagonal block matrix for each RB.

As described above, the data symbol is a group of REs having symbol times different from those of REs allocated to the CRSs. Accordingly, in this embodiment, estimation of a non-diagonal block matrix is based on a received wireless signal corresponding to an SFBC pair transmitted at a time different from a time when CRSs are transmitted.

In this embodiment, the base stations 10-1 and 10-2 start the respective subframes in synchronization with each other. Accordingly, the timing when a CRS is transmitted in the wireless area WA-1 that the base station 10-1 forms is synchronized with the timing when a CRS is transmitted in the wireless area WA-2 that the base station 10-2 forms. In other words, the timing at which a data symbol is transmitted in the wireless area WA-1 is synchronized with the timing at which a data symbol is transmitted in the wireless area WA-2. Accordingly, the data symbol of this embodiment is a group of REs to which an SFBC pair is allocated in both of the wireless areas WA-1 and WA-2.

Alternatively, the non-diagonal block matrix estimator 2222 may use an RE group, which includes REs allocated thereto the first coded signal and the second coded signal in the data symbol among REs included in multiple RBs, as the target range. Further alternatively, the non-diagonal block matrix estimator 2222 may use an RE group, which includes REs allocated thereto the first coded signal and the second coded signal in the data symbol among REs included in the entire system band, as the target range. Accordingly, the non-diagonal block matrix estimator 2222 may use any target range. The non-diagonal block matrix estimator 2222 may adaptively change the target range on the basis of information that indicates the state of communication, such as Doppler frequency or delay spread.

The non-diagonal block matrix estimator 2222 may determine the target range, considering time jitter due to fading or frequency selectivity due to multipath. In this case, the non-diagonal block matrix estimator 2222 may use an RE group, which includes REs allocated thereto the first coded signal and the second coded signal in the data symbol among REs included in a narrower range than a single RB, as the target range.

The non-diagonal component of the non-diagonal block matrix represents the covariance between interference noise on one of a pair of coded signals received by the zeroth receiving antenna and interference noise on the other of the pair of coded signals received by the first receiving antenna. The element of the first row and the fourth column in the covariance matrix represents the covariance between interference noise on the first coded signal of a pair of coded signals received by the zeroth receiving antenna and the interference noise on the second coded signal of the pair of coded signals received by the first receiving antenna. Likewise, the element of the second row and the third column in the covariance matrix represents the covariance between interference noise on the first coded signal of a pair of coded signals received by the first receiving antenna and the interference noise on the second coded signal of the pair of coded signals received by the zeroth receiving antenna. Here, the covariance is an example of a correlation.

The weight calculator 223 calculates a reception weight $W_{IRC}^{(SFBC)}$ based on the covariance matrix $R_{e,I+N}^{(SFBC)}$ calculated by the interference noise covariance matrix calculator 222 and the channel estimated value $H_{e,0}$ estimated by the channel estimator 221 using Expression 36. The term $W_{IRC}^{(SFBC)}(m)$ represents the reception weight for the m-th SFBC pair.

$$W_{IRC}^{(SFBC)}(m)=[H_{e,0}{}^H(\kappa_0(m),\tau_0(m))H_{e,1}{}^H(\kappa_1(m),\tau_1(m))](R_{e,I+N}^{(SFBC)}(m))^{-1} \quad \text{[Expression 36]}$$

Here, terms $\kappa_1(m)$ and $\tau_1(m)$ represent the subcarrier number and the symbol time number of the RE to which the second coded signal of the m-th SFBC pair is allocated, respectively. As described above, in this embodiment, the second coded signal of the m-th SFBC pair includes $x_1(m)$ for the zeroth transmitting antenna and $x_0^*(m)$ for the first transmitting antenna.

The term $H_{e,1}(k, l)$ is expressed by Expression 37.

$$H_{e,1}(k, l) = \begin{bmatrix} h^*_{e,01}(k, l) & -h^*_{e,00}(k, l) \\ h^*_{e,11}(k, l) & -h^*_{e,10}(k, l) \end{bmatrix}$$ [Expression 37]

The equalizer 224 calculates a demodulated signal $x_e(m)$ for the m-th SFBC pair on the basis of the reception weight $W_{IRC}^{(SFBC)}(m)$ calculated by the weight calculator 223 and the received wireless signal y(m) for the m-th SFBC pair using Expression 38 and 39. The multiplication of the received wireless signal y(m) and the reception weight $W_{IRC}^{(SFBC)}(m)$ is also called equalization of the received signal y(m) or the demodulation of the received signal y(m).

$$x_e(m) = W_{IRC}^{(SFBC)}(m)y(m)$$ [Expression 38]

$$y(m) = \begin{bmatrix} y_0(2m) \\ y_1(2m) \\ y_0^*(2m+1) \\ y_1^*(2m+1) \end{bmatrix}$$ [Expression 39]

The post-equalization interference noise power estimator 225 estimates the post-equalization interference noise power $\sigma_{post}^2(m)$ for the m-th SFBC pair on the basis of the calculated covariance matrix $R_{e,I+N}^{(SFBC)}$ and the calculated reception weight $W_{IRC}^{(SFBC)}$ using Expression 40. The post-equalization interference noise power represents power of the interference noise contained in the signal obtained by demodulating the received wireless signal.

$$\tau_{post}^2(m) = W_{IRC}^{(SFBC)}(m)R_{e,I+N}^{(SFBC)}(m)(W_{IRC}^{(SFBC)}(m))^H$$ [Expression 40]

The LLR calculator 226 calculates an LLR for soft-decision decoding based on the demodulated signal $x_e(m)$ calculated by the equalizer 224 and the post-equalization interference noise power $\sigma_{post}^2(m)$ calculated by the post-equalization interference noise power estimator 225. For example, the LLR calculator 226 may calculate an LLR in the method disclosed in the publication of Japanese Patent No. 5326976.

(Operation)

Next, the operation of the wireless communication system 1 will now be described. Here, the description focuses on the modulation in the mobile station 20-1 among the operation performed in the wireless communication system 1.

Figure 12:
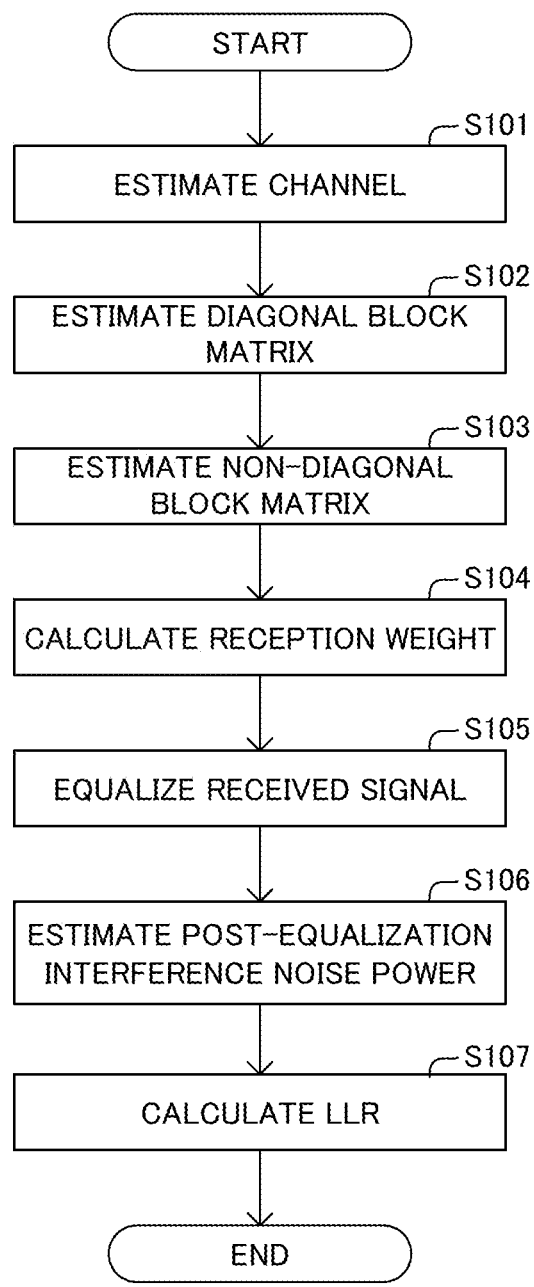
FIG. 12 is a flow diagram denoting an example of a succession of procedural steps performed by a mobile station of FIG. 3

The mobile station 20-1 carries out the procedure illustrated in the flow diagram FIG. 12.

In this embodiment, the mobile station 20-1 estimates the channel based on the received wireless signal (step S101 of FIG. 12). In this embodiment, the mobile station 20-1 estimates the channel for an RE allocated, in the wireless area WA-1, to the CRSs on the basis of the CRSs that the base station 10-1 transmits in the wireless area WA-1.

The mobile station 20-1 estimates a diagonal block matrix of the covariance matrix for the interference noise on the basis of the estimated channel and the received wireless signal corresponding to the RE allocated, in the wireless area WA-1, to the CRS (step S102 of FIG. 12). The interference noise is on the SFBC pair that the base station 10-1 transmits in the wireless area WA-1. In the first embodiment, the interference noise includes noise and interfering wave which is the wireless signal being transmitted by a base station 10-2 in the wireless area WA-2 and being received by the mobile station 20-1.

The mobile station 20-1 estimates a non-diagonal block matrix of a covariance matrix for the interference noise on the basis of the estimated channel and the received wireless signal corresponding to the RE allocated, in the wireless area WA-1, to the data symbol (step S103 of FIG. 12). Here, in the procedure of FIG. 12, the step S103 may be carried out before step S102 is carried out.

On the basis of the estimated channel, the estimated diagonal block matrix, and the estimated non-diagonal block matrix, the mobile station 20-1 calculates the reception weight (step S104 of FIG. 12).

On the basis of the calculated reception weight and the received wireless signal, the mobile station 20-1 equalizes the received wireless signal (step S105 of FIG. 12).

On the basis of the estimated diagonal block matrix, the estimated non-diagonal block matrix, and the calculated reception weight, the mobile station 20-1 estimates the post-equalization interference noise power (step S106 of FIG. 12). In the procedure of FIG. 12, step S106 may be carried out before step S105 is carried out.

On the basis of the received wireless signal after the equalization and the estimated post-equalization interference noise power, the mobile station 20-1 calculates the LLR for soft-decision decoding (step S107 of FIG. 12).

Along the above procedure, the mobile station 20 of the first embodiment estimates the correlation between the interference noise on one of an SFBC pair received by the first antenna and the interference noise on the other of the SFBC pair received by the second antenna. Furthermore, the mobile station 20 processes the received wireless signal (in other words, the received signal) on the basis of the estimated correlation.

Accordingly, this procedure can precisely reflect the actual communication state in processing of a received wireless signal as compared with cases where the correlation is not estimated. Hence, the received wireless signal can be appropriately demodulated, so that the quality of the wireless communication can be enhanced.

In the CRS symbol, one of an SFBC pair is sometimes allocated, in the wireless area WA-2, to an RE allocated to a CRS in the wireless area WA-1. In this case, the other of the same SFBC pair may be allocated, in the wireless area WA-2, to an RE different from RE allocated to a CRS in the wireless area WA-1.

Accordingly, a signal different from a CRS and a CRS are allocated in the wireless area WA-1 to the REs to which an SFBC pair is allocated in the wireless area WA-2. In this case, it is difficult to estimate the above correlation having adequate precision on the basis of the received wireless signals corresponding to such an SFBC pair transmitted in the wireless area WA-2.

In contrast, the mobile station 20 of the first embodiment estimates the above correlation based on the received wireless signal (in this embodiment, received wireless signal for the data symbol) corresponding to the SFBC pair transmitted at a time different from a time when a known reference signal is transmitted.

Accordingly, signals (in this embodiment, an SFBC pair) different from the CRS are allocated, in the wireless area WA-1, to the REs to which an SFBC pair is allocated in the satisfactorily estimate the above correlation with high precision, so that the wireless communication quality can be enhanced.

In addition, the mobile station 20 of the first embodiment estimates the above correlation based on the received wireless signal corresponding to the REs to which an SFBC pair is allocated in each of wireless areas WA-1 and WA-2.

An SFBC pair is allocated, in the wireless area WA-1, to REs to which an SFBC pair is allocated in the wireless area WA-2. Accordingly, the estimated correlation has adequate precision to enhance the quality of the wireless communication.

Further, the mobile station 20 of the first embodiment estimates a covariance matrix for the interference noise on the received wireless signal using the estimated correlation, and processes the received wireless signal using the estimated covariance matrix.

This makes it possible to estimate a highly precise covariance matrix, which allows, for example, to appropriately demodulate the received wireless signal and to estimate the highly precise post-equalization interference noise power. Consequently, the quality of the wireless communication can be enhanced.

Second Embodiment

Next, the wireless communication system according to a second embodiment will now be described. Differently from the wireless communication system 1 of the first embodiment, the wireless communication system of the second embodiment calculates the reception weight based on the covariance matrix for the received wireless signal. The following description will focus on the above difference.

Figure 13:
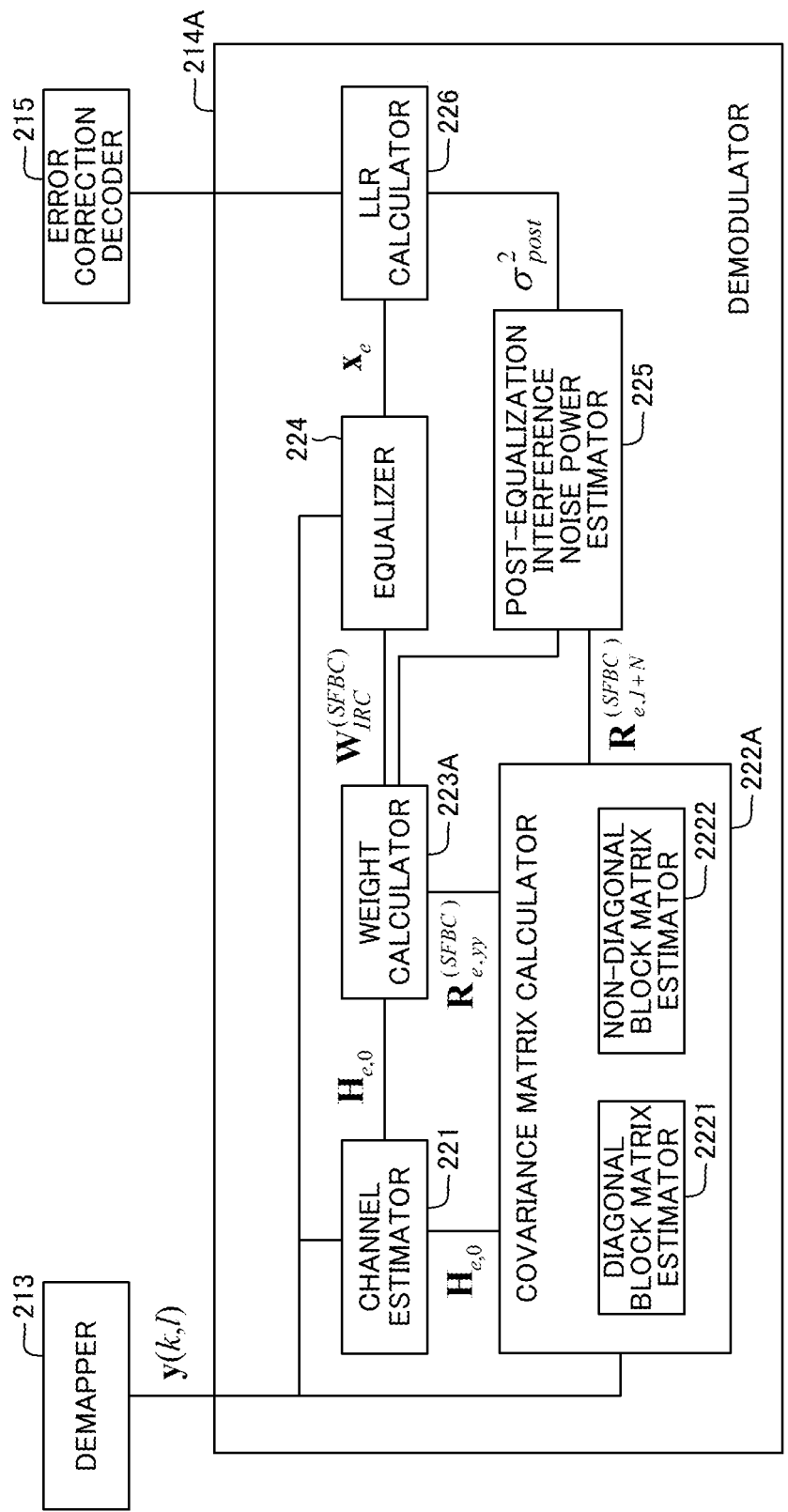
FIG. 13 is a block diagram schematically illustrating an example of the function of a demodulator included in a mobile station according to a second embodiment.

As illustrated in FIG. 13, a demodulator 214A of the second embodiment has the same function as that of demodulator 214 of the first embodiment except for the first and the second differences. The first difference is that the demodulator 214A includes a covariance matrix calculator 222A in place of the interference noise covariance matrix calculator 222 of FIG. 11. The second difference is that the demodulator 214A includes a weight calculator 223A in place of the weight calculator 223 of FIG. 11.

The covariance matrix calculator 222A calculates a covariance matrix for the received wireless signal in addition to the function of the interference noise covariance matrix calculator 222 of the first embodiment. In this embodiment, the covariance matrix calculator 222A calculates the covariance matrix $R_{e,yy}^{(SFBC)}(m)$ for the received wireless signal on the basis of the estimated diagonal block matrix and the estimated non-diagonal block matrix using Expression 41.

[Expression 41]

$$R_{e,yy}^{(SFBC)}(m) = \frac{1}{2}\begin{bmatrix} H_{e,0}(\kappa_0(m),\tau_0(m))H_{e,0}^H(\kappa_0(m),\tau_0(m)) & & \\ & 0\ 0 & \\ & 0\ 0 & \\ & 0\ 0 & \\ & 0\ 0 & \\ & & (H_{e,0}(\kappa_0(m),\tau_0(m))H_{e,0}^H(\kappa_0(m),\tau_0(m)))^T \end{bmatrix} + \begin{bmatrix} R_{e,I+N} & 0\ \rho \\ & -\rho\ 0 \\ 0\ -\rho^* & \\ \rho^*\ 0 & R_{e,I+N}^T \end{bmatrix}$$

$$= \begin{bmatrix} R_{e,I+N} + \frac{1}{2} H_{e,0}(\kappa_0(m),\tau_0(m))H_{e,0}^H(\kappa_0(m),\tau_0(m)) & \\ & 0\ -\rho^* \\ & \rho^*\ 0 \\ & & 0\ \rho \\ & & -\rho\ 0 \\ \left(R_{e,I+N} + \frac{1}{2} (H_{e,0}(\kappa_0(m),\tau_0(m))H_{e,0}^H(\kappa_0(m),\tau_0(m)))\right)^T \end{bmatrix}$$

Alternatively, the covariance matrix calculator 222A may calculate the covariance matrix $R_{e,yy}^{(SFBC)}(m)$ for the received wireless signal using Expression 42 in place of Expression 41.

[Expression 42]

$$R_{e,yy}^{(SFBC)}(m) = \begin{bmatrix} R_{e,I+N} + \frac{1}{2} H_{e,0}(\kappa_0(m),\tau_0(m))H_{e,0}^H(\kappa_0(m),\tau_0(m)) & \\ & 0\ -\rho^* \\ & \rho^*\ 0 \\ & & 0\ \rho \\ & & -\rho\ 0 \\ R_{e,I+N}^T + \frac{1}{2} H_{e,1}(\kappa_1(m),\tau_1(m))H_{e,1}^H(\kappa_1(m),\tau_1(m)) \end{bmatrix}$$

Further alternatively, the covariance matrix calculator 222A may calculate the covariance matrix $R_{e,yy}^{(SFBC)}(m)$ for the received wireless signal using Expression 43 in place of Expression 41. Here, the elements $\lambda_0$ and $\lambda_1$ are expressed by Expressions 44 and 45, respectively.

$$R_{e,yy}^{(SFBC)}(m) = \begin{bmatrix} R_{e,I+N} + \frac{1}{2} H_{e,0}(\kappa_0(m), \tau_0(m))H_{e,0}^H(\kappa_0(m), \tau_0(m)) & & & \\ & -\lambda_0^* & -\rho^* & \\ & \rho^* & -\lambda_1^* & \\ & \lambda_0 & \rho & \\ & -\rho & -\lambda_1 & \\ & & & R_{e,I+N}^T + \frac{1}{2} H_{e,1}(\kappa_1(m), \tau_1(m))H_{e,1}^H(\kappa_1(m), \tau_1(m)) \end{bmatrix}$$ [Expression 43]

$\lambda_0 = h_{00}(\kappa_0(m), \tau_0(m))h_{01}(\kappa_1(m), \tau_1(m)) - h_{01}(\kappa_0(m), \tau_0(m))h_{00}(\kappa_1(m), \tau_1(m))$ [Expression 44]

$\lambda_1 = h_{10}(\kappa_0(m), \tau_0(m))h_{11}(\kappa_1(m), \tau_1(m)) - h_{11}(\kappa_0(m), \tau_0(m))h_{10}(\kappa_1(m), \tau_1(m))$ [Expression 45]

The weight calculator 223A calculates a reception weight $W_{IRC}^{(SFBC)}$ based on the calculated covariance matrix $R_{e,yy}^{(SFBC)}(m)$ for the received wireless signal and the channel estimated value $H_{e,0}$ using Expression 46.

$W_{IRC}^{(SFBC)}(m) = [H_{e,0}^H(\kappa_0(m), \tau_0(m))H_{e,1}^H(\kappa_1(m), \tau_1(m))](R_{e,yy}^{(SFBC)}(m))^{-1}$ [Expression 46]

The mobile station 20 of the second embodiment operates the same as the mobile station 20 of the first embodiment. Thereby, the mobile station 20 of the second embodiment obtains the same effects and advantages as those of the mobile station 20 of the first embodiment.

Third Embodiment

Next, the wireless communication system according to a third embodiment will now be described. Differently from the wireless communication system 1 of the first embodiment, the wireless communication system of the third embodiment does not use the non-diagonal block matrix for estimating the post-equalization interference noise power. The following description will focus on the above difference.

Figure 14:
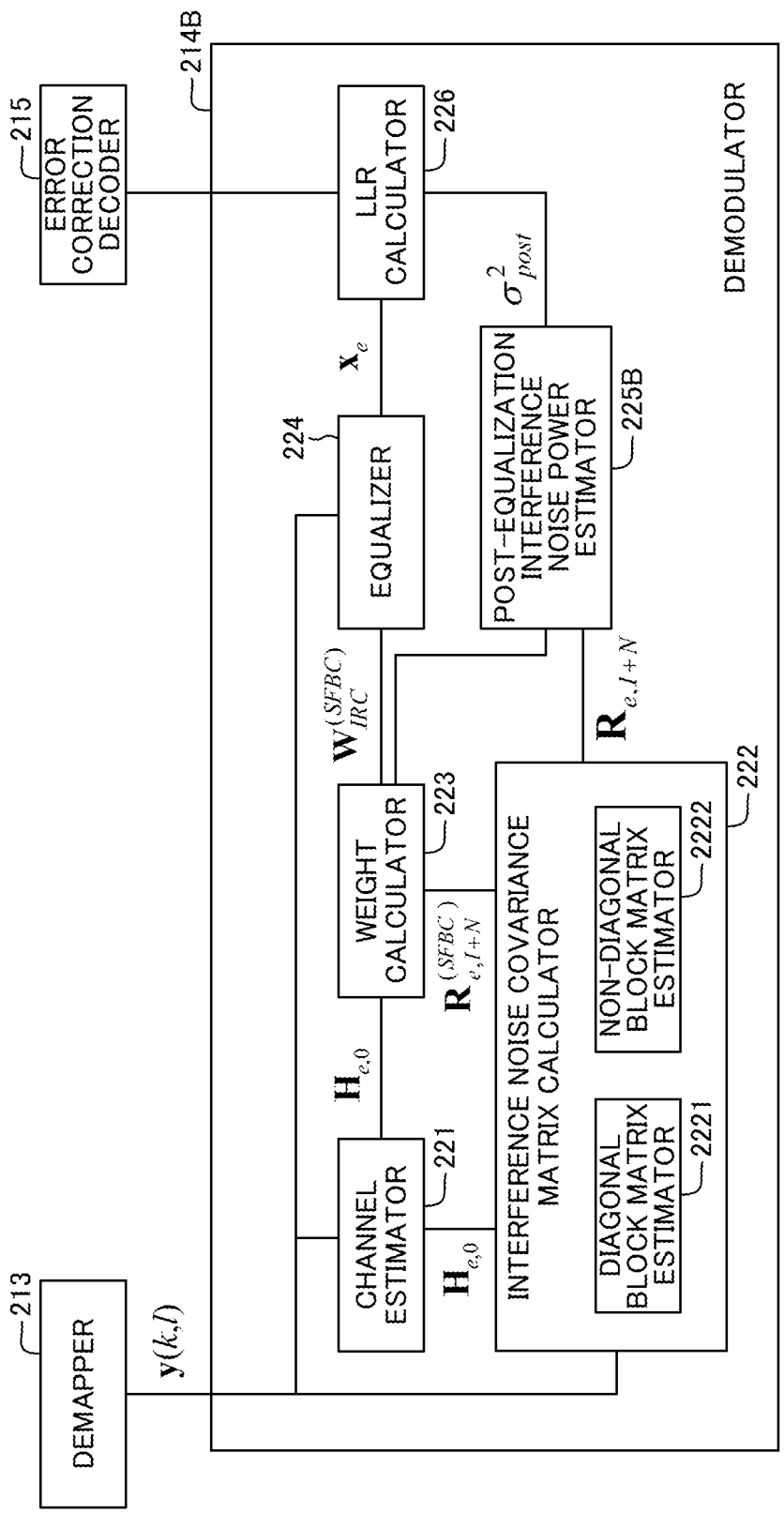
FIG. 14 is a block diagram schematically illustrating an example of the function of a demodulator included in a mobile station according to a third embodiment.

As illustrated in FIG. 14, the demodulator 214B according to the third embodiment has the same function as the demodulator 214 of the first embodiment except for including a post-equalization interference noise power estimator 225B in place of the post-equalization interference noise power estimator 225 of FIG. 11.

The post-equalization interference noise power estimator 225B estimates the post-equalization interference noise power $\tau_{post}^2(m)$ of the m-th SFBC pair on the basis of the estimated diagonal block matrix $R_{e,I+N}$ and the calculated reception weight $W_{IRC}^{(SFBC)}$ using Expression 47. Accordingly, the post-equalization interference noise power estimator 225B estimates the post-equalization interference noise power $\sigma_{post}^2(m)$ without using the non-diagonal block matrix estimated by the non-diagonal block matrix estimator 2222.

$\sigma_{post}^2(m) = W_{IRC}^{(SFBC)}(m) \begin{bmatrix} R_{e,I+N} & 0 \\ 0 & R_{e,I+N}^T \end{bmatrix} (W_{IRC}^{(SFBC)}(m))^H$ [Expression 47]

The mobile station 20 of the third embodiment operates the same as the mobile station 20 of the first embodiment. Thereby, the mobile station 20 of the third embodiment obtains the same effects and advantages as those of the mobile station 20 of the first embodiment.

Furthermore, the mobile station 20 of the third embodiment estimates the post-equalization interference noise power $\sigma_{post}^2(m)$ based on the calculated reception weight $W_{IRC}^{(SFBC)}$ and a covariance matrix having a non-diagonal block matrix being a null matrix for the interference noise on the received wireless signal.

This makes it possible to estimate the post-equalization interference noise power $\sigma_{post}^2(m)$ with high precision, so that the quality of wireless communication can be enhanced.

Fourth Embodiment

Next, the wireless communication system according to a fourth embodiment will now be described. Differently from the wireless communication system 1 of the first embodiment, the wireless communication system of the fourth embodiment estimates the post-equalization interference noise power based on the channel estimated value and a diagonal block matrix. The following description will focus on the above difference.

Figure 15:
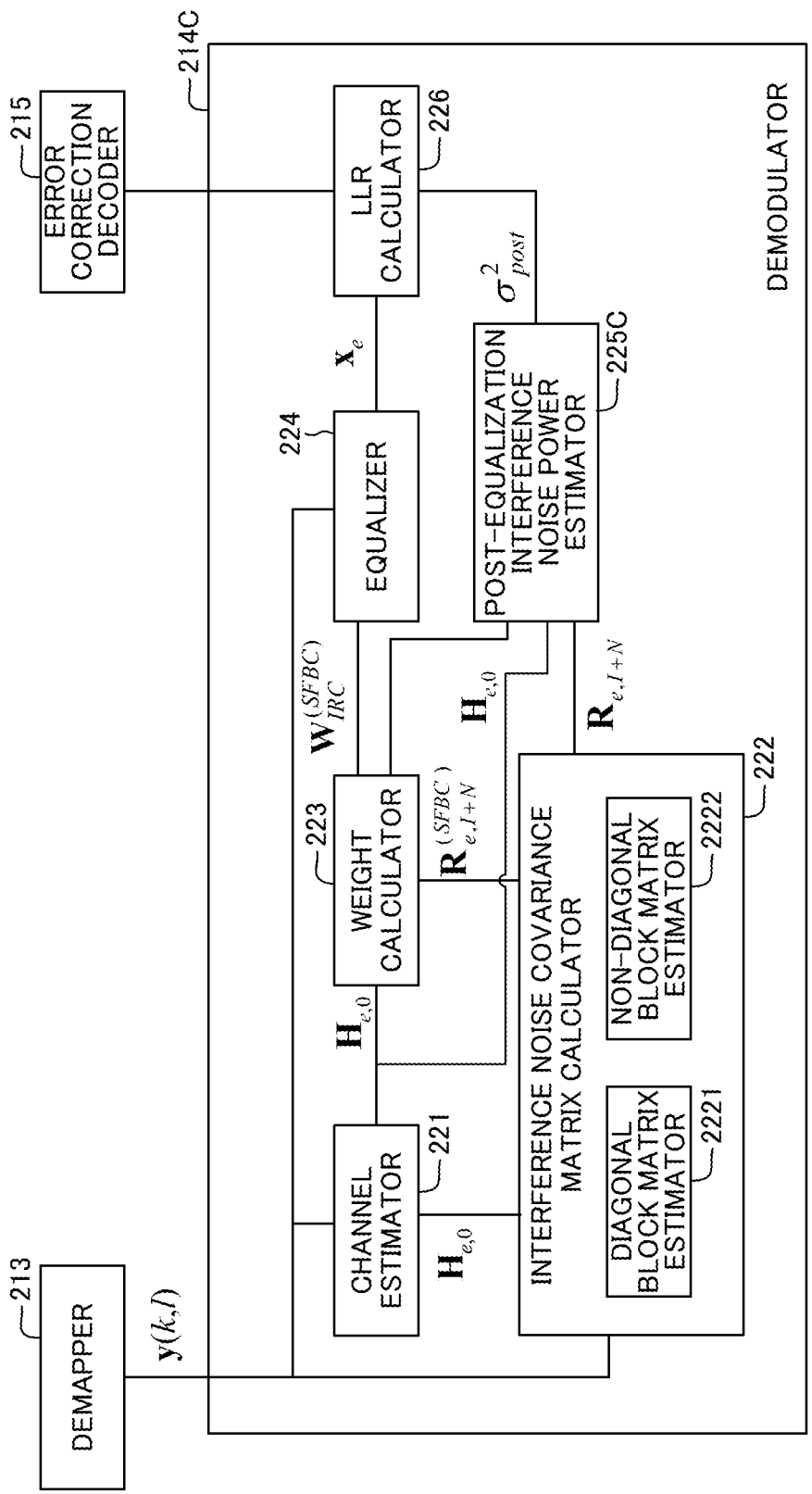
FIG. 15 is a block diagram schematically illustrating an example of the function of a demodulator included in a mobile station according to a fourth embodiment.

As illustrated in FIG. 15, the demodulator 214C of the fourth embodiment has the same function as the demodulator 214 of the first embodiment except for including a post-equalization interference noise power estimator 225C in place of the post-equalization interference noise power estimator 225 of FIG. 11.

The post-equalization interference noise power estimator 225C estimates the post-equalization interference noise power $\sigma_{post}^2(m)$ of the m-th SFBC pair on the basis of the estimated diagonal block matrix $R_{e,I+N}$ and the channel estimated value $H_{e,0}$ using Expression 48. In other words, the post-equalization interference noise power estimator 225C estimates the post-equalization interference noise power $\sigma_{post}^2(m)$ without using the non-diagonal block matrix or the reception weight $W_{IRC}^{(SFBC)}$.

$\sigma_{post}^2(m) = [H_{e,0}^H(2m) \; H_{e,1}^H(2m+1)] \begin{bmatrix} R_{e,I+N} & 0 \\ 0 & R_{e,I+N}^T \end{bmatrix}^{-1}$ [Expression 48]

$\begin{bmatrix} H_{e,0}(2m) \\ H_{e,1}(2m+1) \end{bmatrix} = H_{e,0}^H(2m)(R_{e,I+N})^{-1}H_{e,0}(2m) + H_{e,1}^H(2m)(R_{e,I+N}^T)^{-1}H_{e,1}(2m)$ The mobile station 20 of the fourth embodiment operates the same as the mobile station 20 of the first embodiment. Thereby, the mobile station 20 of the fourth embodiment obtains the same effects and advantages as those of the mobile station 20 of the first embodiment.

Furthermore, the mobile station 20 of the fourth embodiment estimates the post-equalization interference noise power $\sigma_{post}^2(m)$ based on the estimated channel value $H_{e,0}$ and a covariance matrix having a non-diagonal block matrix being a null matrix for the interference noise on the received wireless signal.

This makes it possible to estimate the post-equalization interference noise power $\sigma_{post}^2(m)$ with high precision, so that the quality of wireless communication can be enhanced.

Fifth Embodiment

Next, the wireless communication system according to the fifth embodiment will now be described. The wireless communication system of the fifth embodiment differs from the wireless communication system of the first embodiment in the manner of allocation of a wireless resource to an SFBC pair. The following description will focus on the above difference.

As described above, for example, in the CRS symbol, CRSs for each transmitting antenna are allocated thereto REs at intervals of five REs along the frequency axis. To reduce the possibility of allocating, in different wireless areas, the same RE to the CRS, the REs allocated to CRSs shifts with the respective identifiers, that identify wireless areas WA, along the frequency axis, which generates six patterns of REs to be allocated to the CRSs.

For example, in cases where the number of transmitting antennas is two or four, a wireless resource is allocated to CRSs for two of the transmitting antennas in a single CRS symbol. Therefore, REs are allocated to CRSs at intervals of two REs along the frequency axis in this case, which generates three patterns of REs allocated to signals (e.g., SFBC pair) different from CRSs.

Here, description will now be made in relation to a Comparative Example before allocation of a wireless resource to an SFBC pair in the fifth embodiment is described.

Figure 16:
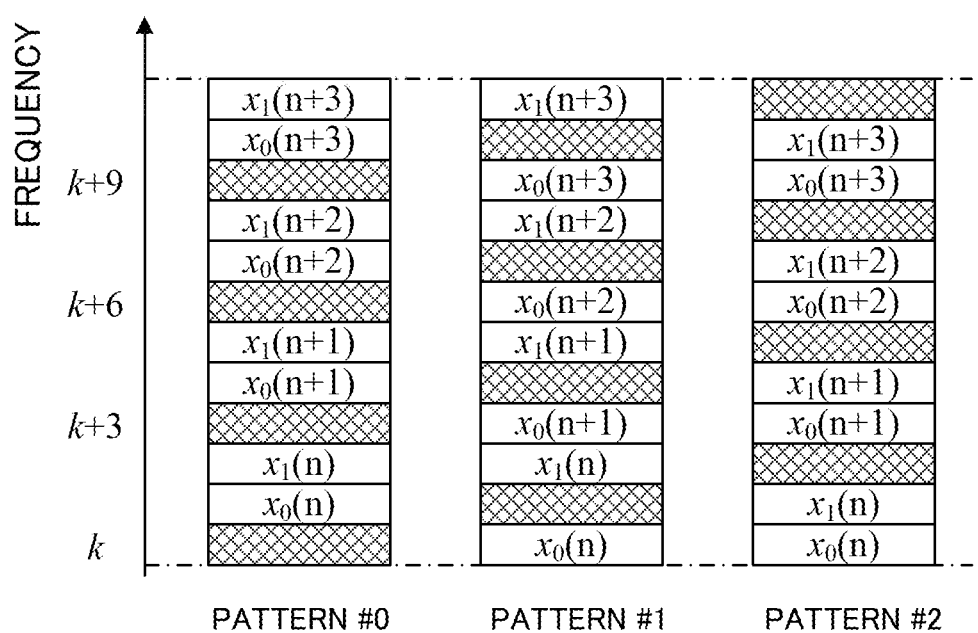
FIG. 16 is a diagram illustrating an example of the pattern of a wireless resource allocated to a coded signal.
Figure 17:
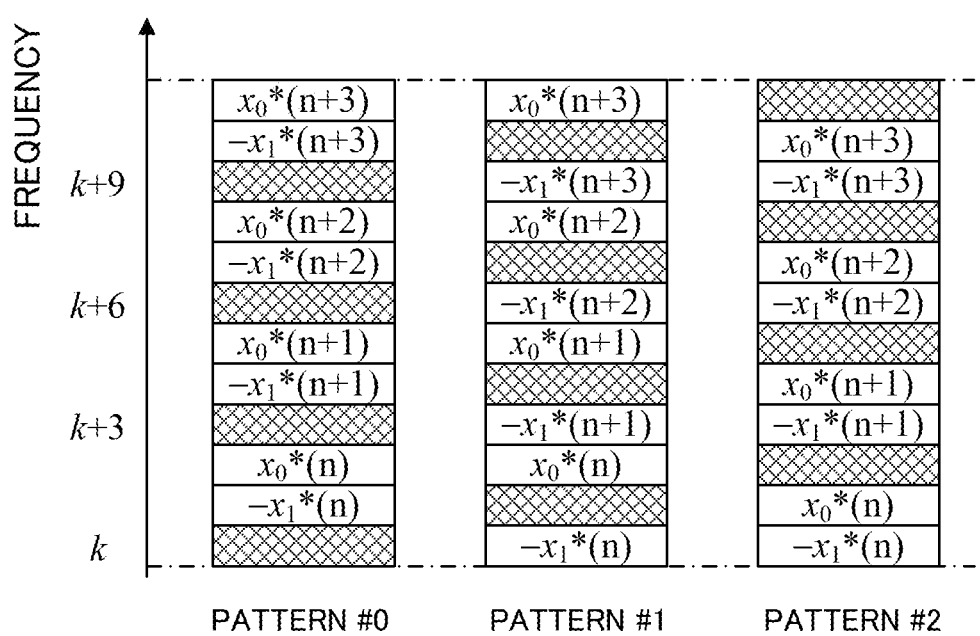
FIG. 17 is a diagram illustrating an example of the pattern of a wireless resource allocated to a coded signal.

FIGS. 16 and 17 illustrate examples of three patterns (pattern #0-#2) of REs allocated to an SFBC pair for the zeroth and the first transmitting antennas. FIGS. 16 and 17, hatched rectangles represent REs allocated to CRSs while not-hatched rectangles represent REs allocated to SFBC pairs.

In the examples of FIGS. 16 and 17, CRSs are allocated to two REs interposing two REs having successive frequencies therebetween along the frequency axis among six REs having successive frequencies. For example, in the zeroth pattern (i.e., pattern #0), among the six REs from the k-th to (k+5)-th subcarriers, two CRSs are allocated to two REs of the k-th and the (k+3)-th REs, between which the (k+1)-th and the (k+2)-th REs having successive frequencies are interposed along the frequency axis. Here, the symbol k represents an integer equal to or more than zero.

In the example of FIGS. 16 and 17, among the above six REs, two SFBC pairs are allocated to the remaining four REs except for the two REs allocated thereto CRSs. To the four remaining REs, one of the first SFBC pair, the other of the first SFBC pair, one of the second SFBC pair, and the other of the second SFBC pair are allocated in the ascending order of the frequencies (in other words, in the order of heightening the frequencies).

For example, in the zeroth pattern (pattern #0), among six REs of the k-th to the (k+5)-th subcarriers, two SFBC pairs of the n-th and (n+1)-th SFBC pairs are allocated to the four REs of (k+1)-th, (k+2)-th, (k+4)-th, and (k+5)-th REs. Here, the symbol n represents an integer equal to or more than zero.

For example, to the (k+1)-th RE, the first transmission symbol $x_0(n)$ and the second transmission symbol $-x_1^*(n)$ of the n-th SFBC pair are allocated for the zeroth and the first transmitting antennas; and to the (k+2)-th RE, the third transmission symbol $x_1(n)$ and the fourth transmission symbol $x_0^*(n)$ of the n-th SFBC pair are allocated for the zeroth and the first transmitting antennas.

Likewise, to the (k+4)-th RE, the first transmission symbol $x_0(n+1)$ and the second transmission symbol $-x_1^*(n+1)$ of the (n+1)-th SFBC pair are allocated for the zeroth and the first transmitting antennas; and to the (k+5)-th RE, the third transmission symbol $x_1(n+1)$ and the fourth transmission symbol $x_0^*(n+1)$ of the (n+1)-th SFBC pair are allocated for the zeroth and the first transmitting antennas.

Figure 18:
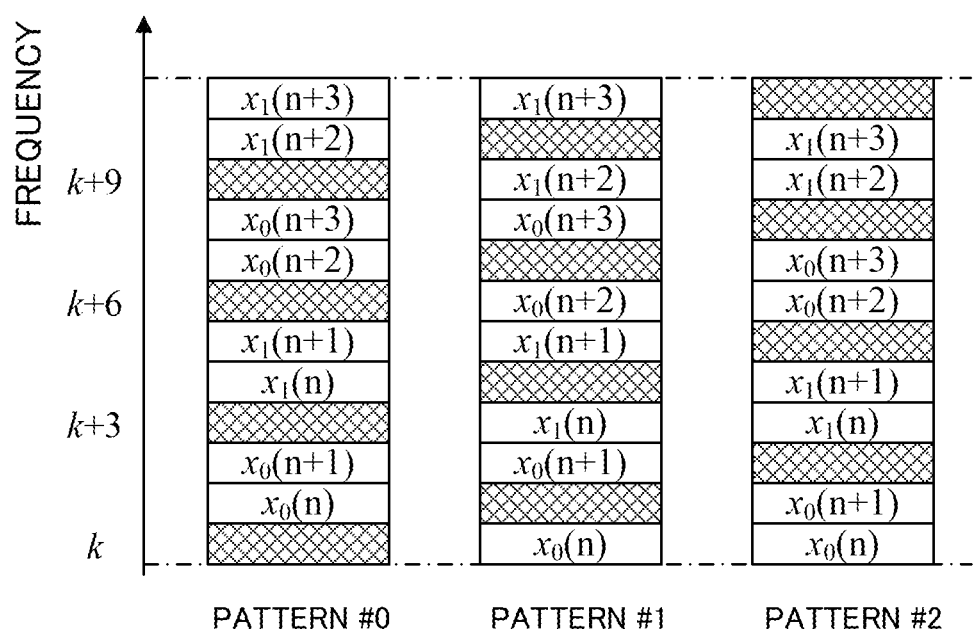
FIG. 18 is a diagram illustrating an example of the pattern of a wireless resource allocated to a coded signal in a wireless communication system according to a fifth embodiment.
Figure 19:
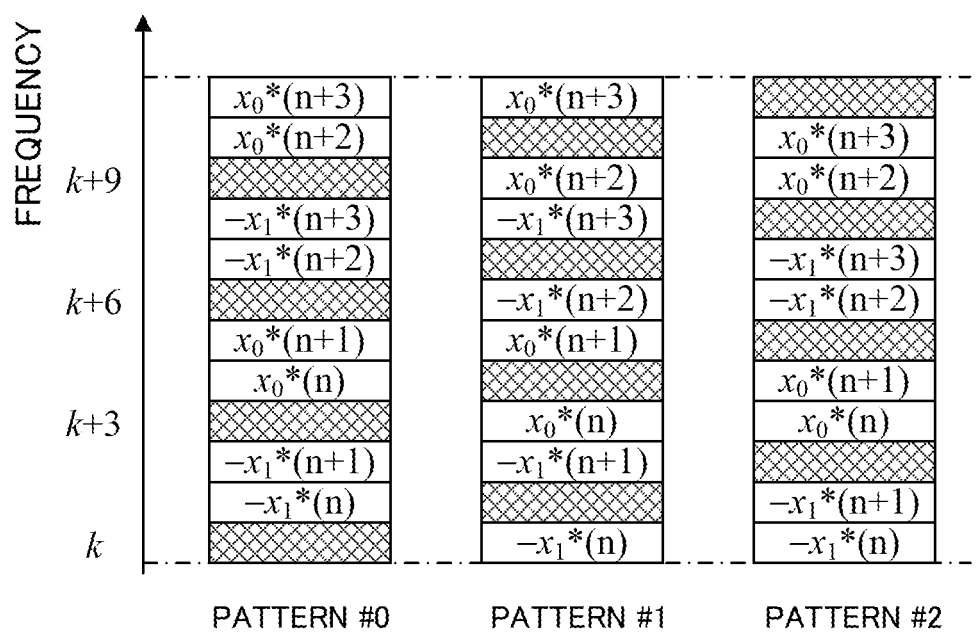
FIG. 19 is a diagram illustrating an example of the pattern of a wireless resource allocated to a coded signal in a wireless communication system according to the fifth embodiment.

In contrast, the wireless communication system 1 according to the fifth embodiment allocates a wireless source to an SFBC pair in the manner illustrated in FIGS. 18 and 19.

FIGS. 18 and 19 illustrate examples of three patterns (pattern #0-#2) of REs allocated to an SFBC pair for the zeroth and the first transmitting antennas. In FIGS. 18 and 19, hatched rectangles represent REs allocated to CRSs while not-hatched rectangles represent REs allocated to SFBC pairs.

In the examples of FIGS. 18 and 19, CRSs are allocated to two REs interposing two REs having successive frequencies therebetween along the frequency axis among six REs having successive frequencies. For example, in the zeroth pattern (i.e., pattern #0), among the six REs from the k-th to (k+5)-th subcarriers, two CRSs are allocated to two REs of the k-th and the (k+3)-th REs, between which two REs of the (k+1)-th and the (k+2)-th REs having successive frequencies are interposed along the frequency axis.

In the example of FIGS. 18 and 19, among the above six REs, two SFBC pairs are allocate to the remaining four REs except for the two REs allocated thereto CRSs. To the four remaining REs, one of the first SFBC pair, one of the second SFBC pair, the other of the first SFBC pair, and the other of the second SFBC pair are allocated in the ascending order of the frequencies.

For example, in the zeroth pattern (pattern #0), among six REs of the k-th to the (k+5)-th subcarriers, two SFBC pairs of the n-th and (n+1)-th SFBC pairs are allocated to the four REs of (k+1)-th, (k+2)-th, (k+4)-th, and (k+5)-th REs.

For example, to the (k+1)-th RE, the first transmission symbol $x_0(n)$ and the second transmission symbol $-x_1^*(n)$ of the n-th SFBC pair are allocated for the zeroth and the first transmitting antennas; and to the (k+2)-th RE, the first transmission symbol $x_0(n+1)$ and the second transmission symbol $-x_1^*(n+1)$ of the (n+1)-th SFBC pair are allocated for the zeroth and the first transmitting antennas.

Likewise, to the (k+4)-th RE, the third transmission symbol $x_1(n)$ and the fourth transmission symbol $x_0^*(n)$ of the n-th SFBC pair are allocated for the zeroth and the first transmitting antennas; and to the (k+5)-th RE, the third transmission symbol $x_1(n+1)$ and the fourth transmission symbol $x_0^*(n+1)$ of the (n+1)-th SFBC pair are allocated for the zeroth and the first transmitting antennas.

The above manner of allocating a wireless resource to an SFBC pair allocates, in the second pattern, a single SFBC pair to two REs successive along the frequency axis among REs allocated to CRSs in the first pattern. In cases where the serving cell uses a different pattern from a pattern that an interfering cell uses, a single SFBC pair is allocated to, in the interfering cell, two REs which are successive along the frequency axis and which are included in the REs allocated in the serving cell to the CRSs.

Here, the following description assumes that the serving cell uses the pattern #0 while the interfering cell uses the pattern #1. In this case, the REs of k-th and the (k+3)-th subcarriers are allocated to the CRSs in the serving cell. In contrast, in the interfering cell, the first transmission symbol $x_0(n)$ and the second transmission symbol $-x_1^*(n)$ of the n-th SFBC pair for the zeroth and the first transmitting antennas are allocated to the RE of the k-th subcarrier. Furthermore, in the interfering cell, the third transmission symbol $x_1(n)$ and the fourth transmission symbol $x_0^*(n)$ of the n-th SFBC pair for the zeroth and the first transmitting antennas are allocated to the RE of the (k+3)-th subcarrier.

As the above, a single SFBC pair is allocated in the interfering cell to two REs, to which CRSs are allocated in the serving cell, according to the fifth embodiment. Consequently, using CRSs makes it possible to estimate the non-diagonal block matrix with high precision, so that the quality of the wireless communication can be enhanced.

In this example, the base station 10 according to the fifth embodiment allocates a wireless resource to SFBC pairs according to one of the three patterns illustrated in FIGS. 18 and 19. For example, the base station 10-1 allocates a wireless resource to SFBC pairs according to the pattern #0 while the base station 10-2 allocates a wireless resource to SFBC pairs according to the pattern #1.

Figure 22:
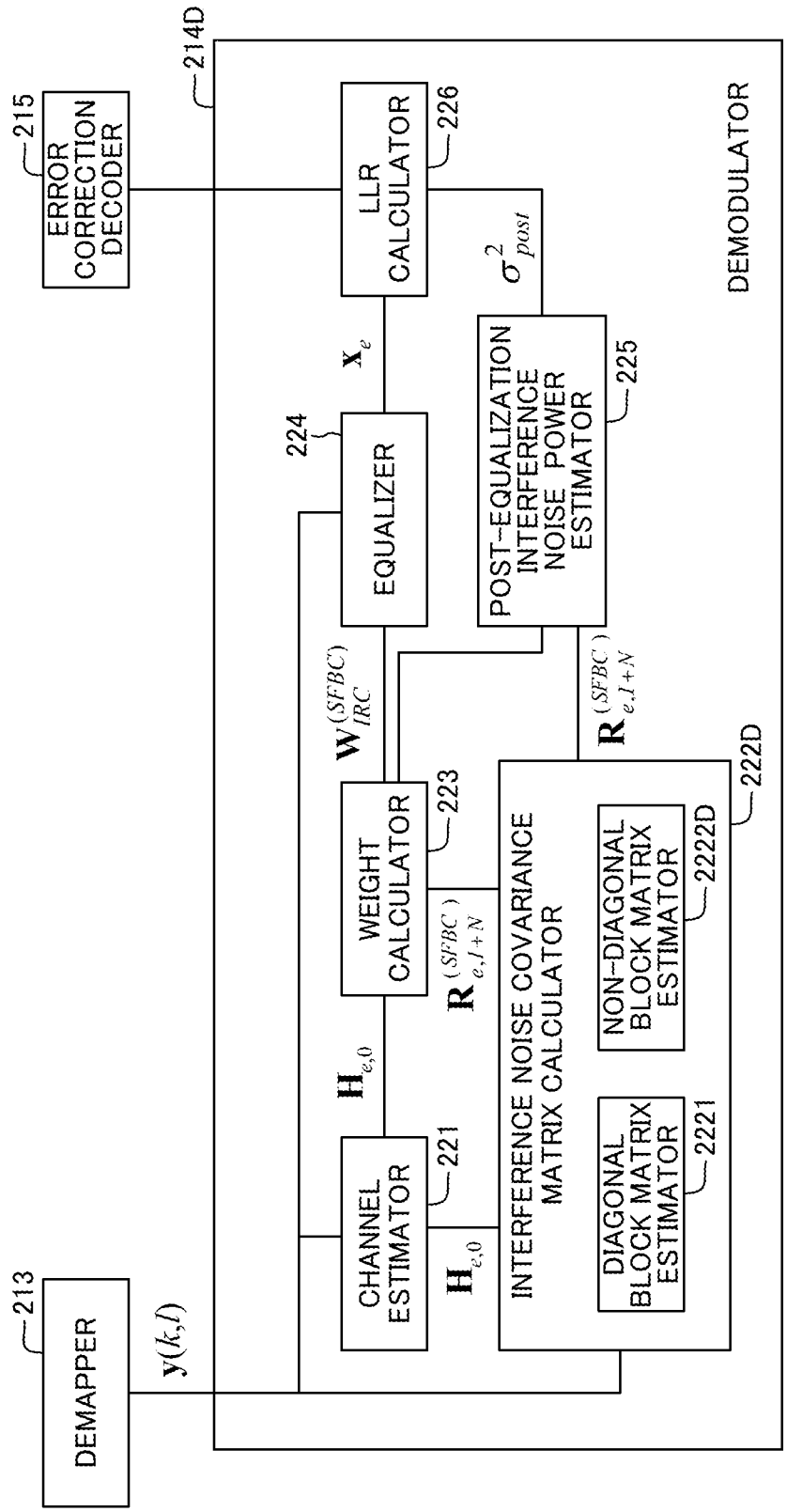
FIG. 22 is a block diagram schematically illustrating an example of the function of a demodulator included in a mobile station of the fifth embodiment.

As illustrated in FIG. 22, a demodulator 214D of the fifth embodiment has the same function as that of the demodulator 214 of the first embodiment except for including an interference noise covariance matrix calculator 222D in place of the interference noise covariance matrix calculator 222 of FIG. 11.

In addition, as illustrated in FIG. 22, the interference noise covariance matrix calculator 222D has the same function as that of the interference noise covariance matrix calculator 222 of the first embodiment except for including a non-diagonal block matrix estimator 2222D in place of the non-diagonal block matrix estimator 2222 of FIG. 11.

The non-diagonal block matrix estimator 2222D has the same function as that of the non-diagonal block matrix estimator 2222 of the first embodiment except for the point of estimating the non-diagonal block matrix using Expression 49 in place of the above Expression 35.

$$\rho = \frac{1}{2}E\{(\{y(6p+v, l)\}_0 - \{H_0(6p+v, l)x_{RS}(6p+v, l)\}_0)(\{y(6p+3+v, l)\}_1 - \{H_0(6p+3+v, l)x_{RS}(6p+3+v, l)\}_1)\} - \frac{1}{2}E\{(\{y(6p+v, l)\}_1 - \{H_0(6p+v, l)x_{RS}(6p+v, l)\}_1)(\{y(6p+3+v, l)\}_0 - \{H_0(6p+3+v, l)x_{RS}(6p+3+v, l)\}_0)\}$$ [Expression 49]

The terms $6p+v$ and $l$ represent the subcarrier number and the symbol time number of an RE included in a RE group that forms a certain target range. Likewise, the terms $6p+3+v$ and $l$ represent the subcarrier number and the symbol time number of an RE included in a RE group that forms the target range.

Figure 20:
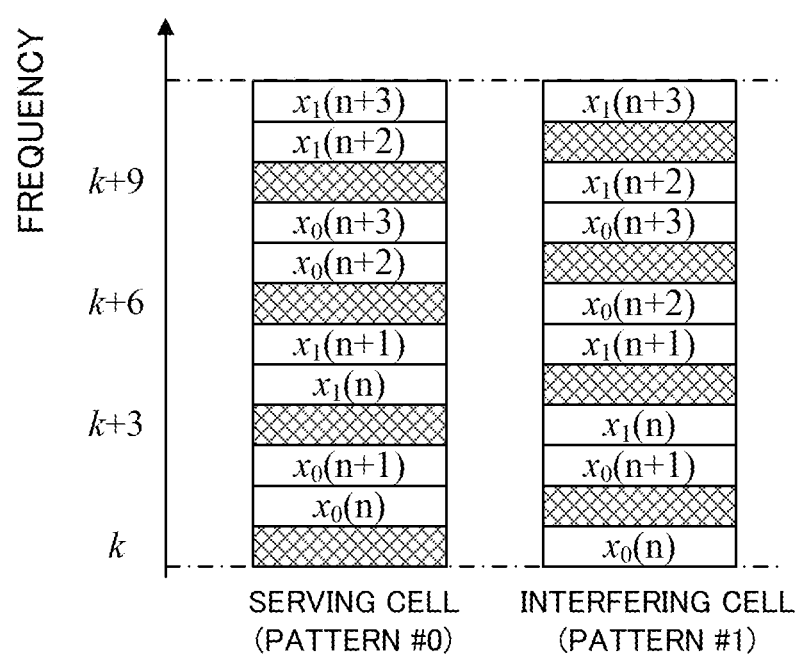
FIG. 20 is a diagram illustrating an example of the pattern of wireless resources allocated to a coded signal in a serving cell and an interfering cell of a wireless communication system according to the fifth embodiment.
Figure 21:
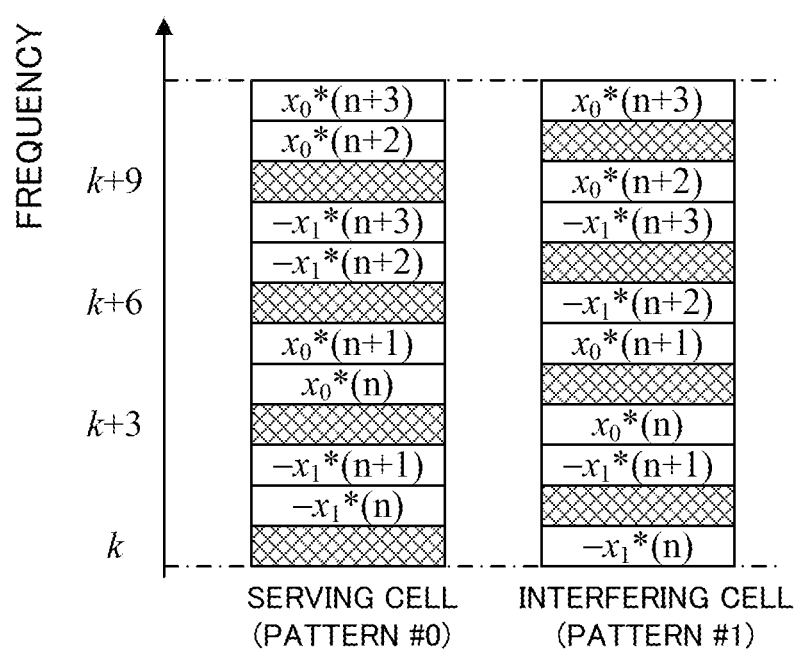
FIG. 21 is a diagram illustrating an example of the pattern of wireless resources allocated to a coded signal in a serving cell and an interfering cell of a wireless communication system according to the fifth embodiment.

The symbol p represents an integer equal to or more than zero and the symbol v represents the number to identify the pattern. In this example, the symbol v represents zero, one, or two. For example, when the serving cell uses the pattern #0 as illustrated in FIG. 20, the symbol v represents 0. The term $\{v\}_0$ represents the element in the zeroth row of the vector v and the term $\{v\}_1$ represents the element in the first row of the vector v.

In this example, the target range is a group of REs allocated in the serving cell thereto CRSs and allocated in the interfering cell thereto the first transmission symbol $x_0$ and the second transmission symbol $-x_1^*$ of an SFBC pair among REs included in an single RB.

In this embodiment, the non-diagonal block matrix estimator 2222D estimates a non-diagonal block matrix for each RB.

Alternatively, the target range may be a group of REs allocated in the serving cell thereto CRSs and allocated in the interfering cell thereto the first transmission symbol $x_0$ and the second transmission symbol $-x_1^*$ of an SFBC pair among REs included in multiple RBs.

Further alternatively, the target range may be a group of REs allocated in the serving cell thereto CRSs and allocated in the interfering cell thereto the first transmission symbol $x_0$ and the second transmission symbol $-x_1^*$ of an SFBC pair among REs included in the entire system band.

The non-diagonal block matrix estimator 2222D may use any target range. The non-diagonal block matrix estimator 2222D may adaptively change the target range on the basis of information that indicates the state of communication, such as Doppler frequency or delay spread.

The non-diagonal block matrix estimator 2222D may determine the target range, considering time jitter due to fading or frequency selectivity due to multipath. For example, the target range may be a group of REs allocated in the serving cell thereto CRSs and allocated in the interfering cell thereto the first transmission symbol $x_0$ and the second transmission symbol $-x_1^*$ of an SFBC pair among REs included in a range narrower than a single RB.

In this embodiment, the non-diagonal block matrix estimator 2222D calculates a replica signal $H_{e,0}(k, l)x_{RS}(k, l)$ being the product of the channel estimated value $H_{e,0}(k, l)$ and the reference signal $x_{RS}(k, l)$ for each combination of k and l. Here, the symbol k represents 2p or 2p+1. Furthermore, the non-diagonal block matrix estimator 2222D calculates a signal by subtracting the replica signal $H_{e,0}(k, l)x_{RS}(k, l)$ from the received wireless signal $y(k, l)$ for each combination of k and l. In this embodiment, the received wireless signal $y(k, l)$ is one corresponding to an RE allocated in the serving cell to CRS. In addition, the non-diagonal block matrix estimator 2222D estimates the non-diagonal block matrix based on the calculated signal using the above Expression 49.

This makes it possible to estimate a highly precise non-diagonal block matrix.

As described above, the wireless communication system 1 of the fifth embodiment, a single SFBC pair is allocated in the wireless area WA-2 to two REs allocated in the wireless area WA-1 to CRSs, and the mobile station 20-1 estimates the correlation based on the received wireless signal corresponding to the REs allocated in the wireless area WA-2 to an SFBC pair. For example, this correlation is one between the interference noise on one of the SFBC pair received by the zeroth receiving antenna and the interference noise on the other of the SFBC pair received by the first receiving antenna.

Thereby, a single SFBC pair is allocated in the wireless area WA-2 to two REs allocated in a wireless area WA-1 to CRSs. Using CRSs as the above makes it possible to estimate the above correlation with high precision, so that the quality of the wireless communication can be enhanced.

Further, the wireless communication system 1 of the fifth embodiment allocates, both in the wireless area WA-1 and the wireless area WA-2, CRSs to two REs interposing two REs having successive frequencies therebetween along the frequency axis among six REs having successive frequencies. In addition, the wireless communication system 1 of this embodiment allocates, both in the wireless area WA-1 and the wireless area WA-2, the first and the second SFBC pairs to the remaining four REs except for two REs allocated thereto CRSs. For example, one of the first SFBC pair, one of the second SFBC pair, the other of the first SFBC pair, and the other of the second SFBC pair are allocated to the remaining four REs in the ascending order of frequencies.

The fifth embodiment allocates in the wireless area WA-2 one and the other of an SFBC pair to the two REs allocated in the wireless area WA-1 to CRSs. Consequently, using CRSs as the above makes it possible to estimate the above correlation with high precision using the received signal corresponding to the REs allocated in the wireless area WA-2 to an SFBC pair, so that the quality of wireless communication can be enhanced.

Sixth Embodiment

Next, a wireless communication system according to a sixth embodiment will now be described. Differently from the wireless communication system of the first embodiment, the wireless communication system of the sixth embodiment estimates a covariance matrix based on a channel for a wireless resource in an interfering cell. The following description will focus on the difference.

Figure 23:
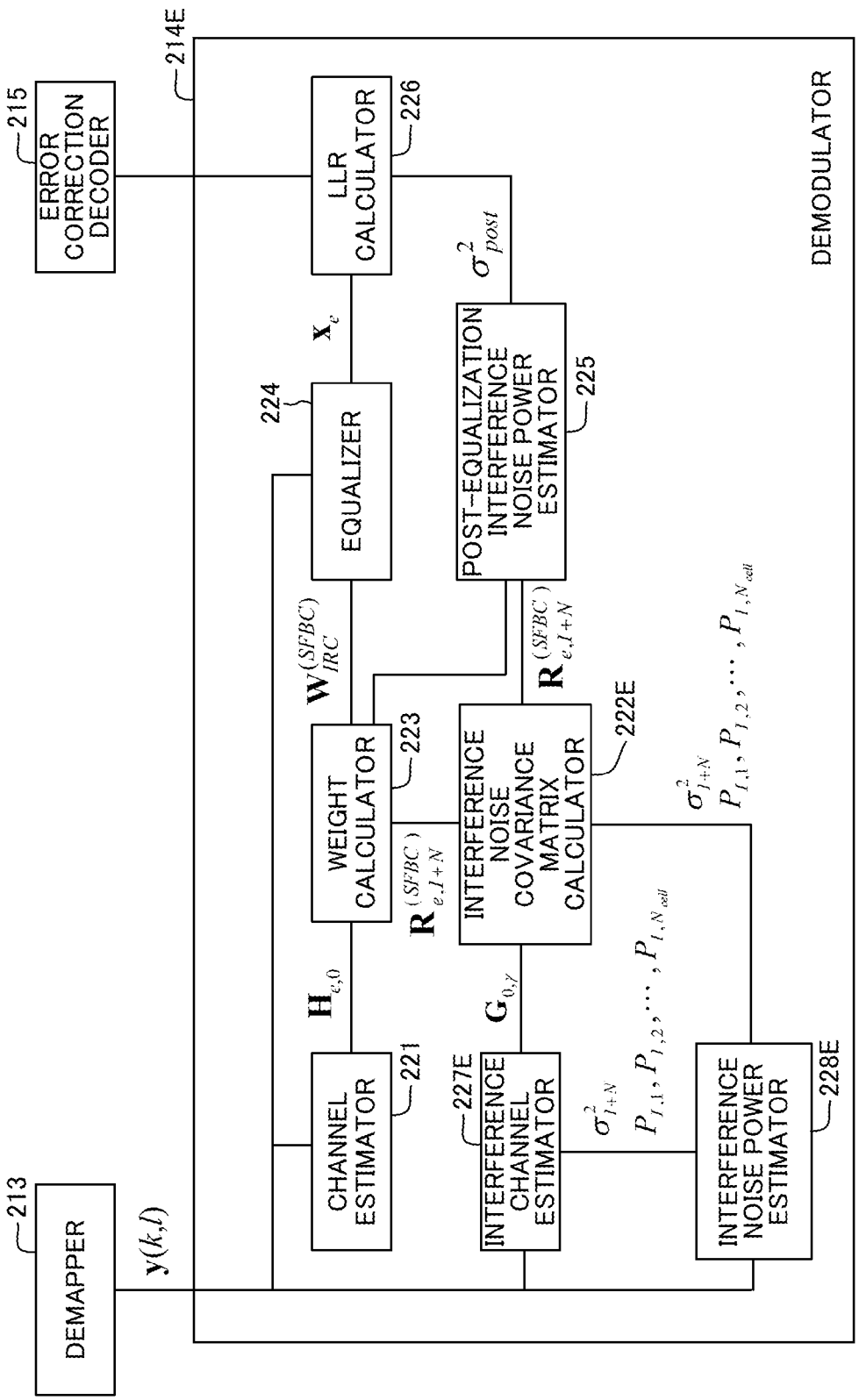
FIG. 23 is a block diagram schematically illustrating an example of the function of a demodulator included in a mobile station according to a sixth embodiment.

As illustrated in FIG. 23, the demodulator 214E of the sixth embodiment has the same function as that of the demodulator 214 of the first embodiment except for including an interference noise covariance matrix calculator 222E, an interference channel estimator 227E, and an interference noise power estimator 228E in place of the interference noise covariance matrix calculator 222 of FIG. 11.

The interference noise power estimator 228E estimates interference noise power $\sigma_{I+N}^2$, and interfering wave powers $P_{I,1}, P_{I,2}, \ldots, P_{I,Ncell}$ of respective interfering cells. Interference noise power is power of an interference noise contained in a received wireless signal. The interfering wave power is power of interfering wave that is caused by a wireless signal transmitted in the interfering cell and that is included in the received wireless signal. Here, the term $P_{I,\eta}$ represents interfering wave power of the η-th interfering cell. The symbol η represents an integer of from one to $N_{cell}$, and the term $N_{cell}$ represents the number of interfering cells.

The interference channel estimator 227E estimates a channel between a base station 10 and a mobile station 20 in each interfering cell having interfering wave power equal to or larger than a certain threshold power $P_{th}$. In the sixth embodiment, the interference channel estimator 227E estimates the channel using the CRSs transmitted in the interfering cell. The estimated value $G_{0,\gamma}(k, l)$ of a channel matrix for the RE having the l-th symbol time among REs of the k-th subcarrier in the γ-th interfering cell is expressed by Expression 50.

$$G_{0,\gamma}(k, l) = \begin{bmatrix} g_{00,\gamma}(k, l) & g_{01,\gamma}(k, l) \\ g_{10,\gamma}(k, l) & g_{11,\gamma}(k, l) \end{bmatrix}$$ [Expression 50]

In the above expression, the element $g_{uv,\gamma}(k, l)$ represents a channel estimated value of a channel between the u-th transmitting antenna and the v-th receiving antenna in the γ-th interfering cell. Each of the symbols u and v represents zero or one. The symbol γ represents the number of the interfering cell having interfering wave power $P_{I,\eta}$ estimated by the interference noise power estimator 228E equal to or larger than the threshold power $P_{th}$.

The interference noise covariance matrix calculator 222E estimates the covariance matrix $R_{e,I+N}^{(SFBC)}$ for the interference noise on the received wireless signal on the basis of the channel estimated value $G_{0,\gamma}$, the interference noise power $\sigma_{I+N}^2$, and interfering wave powers $P_{I,1}, P_{I,2}, \ldots, P_{I,Ncell}$ of respective interfering cells, using Expression 51. Here, Expression 51 is derived from the Expressions 52 to 55. The element $G_{1,\gamma}(k, l)$ is expressed by Expression 56.

$$R_{I+N}^{(SFBC)}(k, l) =$$ [Expression 51]
$$\frac{1}{2} \sum_{\gamma \in (P_{I,\eta} \geq P_{th})} \begin{bmatrix} G_{0,\gamma}(k, l)G_{0,\gamma}^H(k, l) & G_{0,\gamma}(k, l)G_{1,\gamma}^H(k, l) \\ G_{0,\gamma}(k, l)G_{1,\gamma}^H(k, l)^H & G_{0,\gamma}(k, l)G_{0,\gamma}^H(k, l)^T \end{bmatrix} + \sigma_N^2 I$$

$$G_{0,\gamma}G_{0,\gamma}^H = \begin{bmatrix} g_{00,\gamma} & g_{01,\gamma} \\ g_{10,\gamma} & g_{11,\gamma} \end{bmatrix} \begin{bmatrix} g_{00,\gamma}^* & g_{10,\gamma}^* \\ g_{01,\gamma}^* & g_{11,\gamma}^* \end{bmatrix} =$$ [Expression 52]
$$\begin{bmatrix} |g_{00,\gamma}|^2 + |g_{01,\gamma}|^2 & g_{00,\gamma}g_{10,\gamma}^* - g_{01,\gamma}g_{11,\gamma}^* \\ g_{10,\gamma}g_{00,\gamma}^* - g_{11,\gamma}g_{01,\gamma}^* & |g_{10,\gamma}|^2 + |g_{11,\gamma}|^2 \end{bmatrix}$$

$$G_{1,\gamma}G_{1,\gamma}^H = \begin{bmatrix} g_{01,\gamma}^* & -g_{00,\gamma}^* \\ g_{11,\gamma}^* & -g_{10,\gamma}^* \end{bmatrix} \begin{bmatrix} g_{01,\gamma} & g_{11,\gamma} \\ -g_{00,\gamma} & -g_{10,\gamma} \end{bmatrix} =$$ [Expression 53]
$$\begin{bmatrix} |g_{00,\gamma}|^2 + |g_{01,\gamma}|^2 & g_{10,\gamma}g_{00,\gamma}^* - g_{11,\gamma}g_{01,\gamma}^* \\ g_{00,\gamma}g_{10,\gamma}^* - g_{01,\gamma}g_{11,\gamma}^* & |g_{10,\gamma}|^2 + |g_{11,\gamma}|^2 \end{bmatrix} = (G_{0,\gamma}G_{0,\gamma}^H)^T$$

$$G_{0,\gamma}G_{1,\gamma}^H = \begin{bmatrix} g_{00,\gamma} & g_{01,\gamma} \\ g_{10,\gamma} & g_{11,\gamma} \end{bmatrix} \begin{bmatrix} g_{01,\gamma} & g_{11,\gamma} \\ -g_{00,\gamma} & -g_{10,\gamma}^* \end{bmatrix} =$$ [Expression 54]
$$\begin{bmatrix} 0 & g_{00,\gamma}g_{11,\gamma} - g_{01,\gamma}g_{10,\gamma} \\ g_{10,\gamma}g_{01,\gamma} - g_{11,\gamma}g_{00,\gamma} & 0 \end{bmatrix}$$

$$G_{1,\gamma}G_{0,\gamma}^H = \begin{bmatrix} g_{01,\gamma}^* & -g_{00,\gamma}^* \\ g_{11,\gamma}^* & -g_{10,\gamma}^* \end{bmatrix} \begin{bmatrix} g_{00,\gamma}^* & g_{10,\gamma}^* \\ g_{01,\gamma}^* & g_{11,\gamma}^* \end{bmatrix} =$$ [Expression 55]
$$\begin{bmatrix} 0 & g_{10,\gamma}^*g_{01,\gamma}^* - g_{11,\gamma}^*g_{00,\gamma} \\ g_{00,\gamma}^*g_{11,\gamma}^* - g_{01,\gamma}^*g_{10,\gamma}^* & 0 \end{bmatrix} = (G_{0,\gamma}G_{1,\gamma}^H)^H$$

$$G_{1,\gamma}(k, l) = \begin{bmatrix} g_{01,\gamma}^*(k, l) & -g_{00,\gamma}^*(k, l) \\ g_{11,\gamma}^*(k, l) & -g_{10,\gamma}^*(k, l) \end{bmatrix}$$ [Expression 56]

Noise power $\sigma_N^2$ is calculated on the basis of the interference noise power $\sigma_{I+N}^2$ and interfering wave powers $P_{I,1}$, $P_{I,2}, \ldots, P_{I,Ncell}$ of respective interfering cells using Expression 57.

$$\sigma_N^2 = \sigma_{I+N}^2 - \sum_{\gamma \in (P_{I,\eta} \geq P_{th})} P_{I,\gamma} \qquad \text{[Expression 57]}$$

The interference noise covariance matrix calculator 222E may estimate the non-diagonal block matrix of the covariance matrix on the basis of only the channel estimated value for an interfering cell where SFBC is performed. In this case, for example, the base station 10 that forms the serving cell may notify information to identify an interfering cell, where SFBC is performed, to the mobile station 20.

For example, the interference noise covariance matrix calculator 222E estimates the covariance matrix $R_{e,I+N}^{(SFBC)}$ for the interference noise using Expression 58 in place of Expression 51.

$$R_{I+N}^{(SFBC)}(k, l) = \frac{1}{2}\begin{bmatrix} \sum_{\gamma \in (P_{I,\eta} \geq P_{th})} G_{0,\gamma}(k,l) G_{0,\gamma}^H(k,l) & \sum_{\gamma' \in (P_{I,\eta} \geq P_{th}, F_{SFBC}=1)} G_{0,\gamma'}(k,l) G_{1,\gamma'}^H(k,l) \\ \sum_{\gamma' \in (P_{I,\eta} \geq P_{th}, F_{SFBC}=1)} \left(G_{0,\gamma'}(k,l) G_{1,\gamma'}^H(k,l)\right)^H & \sum_{\gamma \in (P_{I,\eta} \geq P_{th})} \left(G_{0,\gamma}(k,l) G_{0,\gamma}^H(k,l)\right)^T \end{bmatrix} + \sigma_N^2 I \qquad \text{[Expression 58]}$$

Here, the symbol γ' represents the number of the interfering cell having interfering wave power $P_{I,\eta}$ equal to or more than the threshold power $P_{th}$ and having an SFBC executing flag set to be "1". The SFBC executing flag is set to be "1" when SFBC is performed in the interfering cell and is set to be "0" when SFBC is not performed.

As the above, the mobile station 20-1 of the sixth embodiment estimates the channel for a wireless resource in the wireless area WA-2, which is different from the wireless area WA-1 where an SFBC pair is transmitted, on the basis of CRSs transmitted in the wireless area WA-2, and further estimates the correlation based on the estimated channel. This correlation is one between the interference noise on one of the SFBC pair received by the zeroth receiving antenna and the interference noise on the other of the SFBC pair received by the first receiving antenna.

This makes it possible to estimate the above correlation with high precision, so that the quality of a wireless communication can be enhanced.

Additional embodiments can be further suggested by combining the above embodiments.

The above embodiments assume to have two transmitting antennas 16 and two receiving antennas 25. Alternatively, the number of transmitting antenna may be three or more and likewise the number of receiving antenna may be three or more.

The above embodiments uses SFBC as Alamouti-type coding, but may alternatively use Space Time Block Coding (STBC).

The above embodiments applies the apparatuses and the methods to the downlink communication, but the apparatuses and the methods may be applied to uplink communication in place of or in addition to the downlink communication.

As an aspect, the quality of wireless communication can be enhanced.

All examples and conditional language provided herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A receiving apparatus comprising:
 a plurality of antennas that includes a first antenna and a second antenna;
 a receiver that receives a wireless signal containing a pair of coded signals through the plurality of antennas, the pair of coded signals being generated by coding first modulation symbol $x_0$ and a second modulation symbol $x_1$ in space frequency block coding, the pair of coded signals including a first coded signal and a second coded signal, the first coded signal including the first modulation symbol $x_0$ as a first transmission symbol transmitted from a first transmitting antenna and a symbol $-x_1^*$ being obtained by inverting a sign of a complex conjugate of the second modulation symbol $x_1$ as a second transmission symbol transmitted from a second transmitting antenna, the second coded signal including the second modulation symbol $x_1$ as a third transmission symbol transmitted from the first transmitting antenna and a symbol $x_0^*$ being a complex conjugate of the first modulation symbol $x_0$ as a fourth transmission symbol transmitted from the second transmitting antenna; and
 a processor that estimates a correlation between an interference noise on one of the pair of coded signals received through the first antenna and an interference noise on the other of the pair of coded signals received through the second antenna, and processes the received wireless signal using the correlation.

2. The receiving apparatus according to claim 1, wherein the processor estimates the correlation using the received wireless signal transmitted at a time different from a time when a known reference signal is transmitted.

3. The receiving apparatus according to claim 2, wherein the processor estimates the correlation using the received wireless signal corresponding to a wireless resource allocated to a pair of coded signals in both of a first wireless area and a second wireless area different from the first wireless area, the pair of coded signals being coded in space frequency block coding.

4. The receiving apparatus according to claim 1, wherein a pair of coded signals is allocated to a wireless resource in a second wireless area,
wherein:
the pair of coded signals is coded in space frequency block coding;
the wireless resource is allocated to a known reference signal in a first wireless area; and
the second wireless area is different from the first wireless area; and
the processor estimates the correlation using the received wireless signal corresponding to the wireless resource allocated to the pair of coded signals in the second wireless area.

5. The receiving apparatus according to claim 4, wherein the wireless resource includes a plurality of resource elements having different combinations of a time and a frequency; and
in each of the first wireless area and the second wireless area,
reference signals are allocated to two resource elements interposing two resource elements having successive frequencies therebetween along a frequency axis among six resource elements having successive frequencies, while one of a first pair of coded signals, one of a second pair of coded signals, the other of the first pair of coded signals, and the other of the second pair of coded signals are allocated to the remaining four resource elements among the six resource elements in an ascending order of the frequency, the first pair of coded signals being coded in space frequency block coding, the second pair of coded signals being coded in space frequency block coding.

6. The receiving apparatus according to claim 4, wherein the processor estimates a channel for a wireless resource allocated to the reference signal in the first wireless area, and estimates the correlation using a signal obtained by subtracting a signal based on a product of the channel and the reference signal from the received wireless signal corresponding to the wireless resource allocated to the reference signal in the first wireless area.

7. The receiving apparatus according to claim 1, wherein the processor estimates a channel for a wireless resource in a second wireless area using a known reference signal transmitted in the second wireless area different from a first wireless area, and estimates the correlation using the channel, the pair of coded signals being transmitted in the first wireless area.

8. The receiving apparatus according to claim 1, wherein the processor estimates a covariance matrix for one of the received wireless signal and an interference noise on the received wireless signal using the correlation, and processes the received wireless signal using the covariance matrix.

9. The receiving apparatus according to claim 8, wherein the processor calculates, using the covariance matrix, a reception weight to demodulate the received wireless signal, and estimates, using the reception weight and the covariance matrix for the interference noise on the received wireless signal, the covariance matrix having the correlation of zero, an power of an interference noise on a signal obtained by demodulating the received wireless signal.

10. The receiving apparatus according to claim 1, wherein the processor estimates a channel for a wireless resource allocated to a known reference signal, and estimates a variance of an interference noise on one of the pair of coded signals received through the first antenna and a variance of an interference noise on one of the pair of coded signals received through the second antenna using a signal obtained by subtracting a signal based on a product of the channel and the reference signal from the received wireless signal corresponding to the reference signal.

11. The receiving apparatus according to claim 1, wherein the processor calculates a reception weight using the covariance matrix having the correlation and demodulates the received wireless signal using the reception weight.

12. A method for receiving comprising:
receiving a wireless signal containing a pair of coded signals through a plurality of antennas including a first antenna and a second antenna, the pair of coded signals being generated by coding a first modulation symbol $x_0$ and a second modulation symbol $x_1$ in space frequency block coding, the pair of coded signals including a first coded signal and a second coded signal, the first coded signal including the first modulation symbol $x_0$ as a first transmission symbol transmitted from a first transmitting antenna and a symbol $-x_i^*$ being obtained by inverting a sign of a complex conjugate of the second modulation symbol $x_1$ as a second transmission symbol transmitted from a second transmitting antenna, the second coded signal including the second modulation symbol $x_1$ as a third transmission symbol transmitted from the first transmitting antenna and a symbol $x_0^*$ being a complex conjugate of the first modulation symbol $x_0$ as a fourth transmission symbol transmitted from the second transmitting antenna;
estimating a correlation between an interference noise on one of the pair of coded signals received through the first antenna and an interference noise on the other of the pair of coded signals received through the second antenna; and
processing the received wireless signal using the correlation.

13. The method according to claim 12, wherein the correlation is estimated using the received wireless signal transmitted at a time different from a time when a known reference signal is transmitted.

14. The method according to claim 12, wherein
the correlation is estimated using the received wireless signal corresponding to a wireless resource,
wherein:
the wireless resource is allocated to a known reference signal in a first wireless area and is allocated to a pair of coded signals in a second wireless area;
the pair of coded signals is coded in space frequency block coding; and
the second wireless area is different from the first wireless area.

15. The method according to claim 12, further comprising:
estimating a channel for a wireless resource in a second wireless area using a known reference signal transmitted in the second wireless area, the second wireless area being different from a first wireless area, the pair of coded signals being transmitted in the first wireless area; and
estimating the correlation using the channel.

16. A transmitting apparatus comprising:
a plurality of antennas that includes a first antenna and a second antenna;

a transmitter that transmits, in a first wireless area, a known reference signal using a resource element through the plurality of antennas, wherein:
the resource element is identified by a combination of a time and a frequency;
the resource element is allocated to a pair of coded signals in a second wireless area;
the pair of coded signals is generated by coding a first modulation symbol $x_0$ and a second modulation symbol $x_1$ in space frequency block coding, the pair of coded signals including a first coded signal and a second coded signal, the first coded signal including the first modulation symbol $x_0$ as a first transmission symbol transmitted from the first antenna and a symbol $-x_1$ being obtained b inverting a sun of a complex conjugate of the second modulation symbol $x_1$ as a second transmission symbol transmitted from the second antenna, the second coded signal including the second modulation symbol $x_1$ as a third transmission symbol transmitted from the first antenna and a symbol $x_0^*$ being a complex conjugate of the first modulation symbol $x_0$ as a fourth transmission symbol transmitted from the second antenna; and
the second wireless area is different from the first wireless area.

17. The transmitting apparatus according to claim 16, wherein
in each of the first wireless area and the second wireless area,
reference signals are allocated to two resource elements interposing two resource elements having successive frequencies therebetween along a frequency axis among six resource elements having successive frequencies, while one of a first pair of coded signals, one of a second pair of coded signals, the other of the first pair of coded signals, and the other of the second pair of coded signals are allocated to the remaining four resource elements among the six resource elements in an ascending order of the frequency, the first pair of coded signals being coded in space frequency block coding, the second pair of coded signals being coded in space frequency block coding.

18. A method for transmitting comprising
transmitting, in a first wireless area, a known reference signal using a resource element, through a plurality of antennas including a first antenna and a second antenna, wherein:
the resource element is identified by a combination of a time and a frequency;
the resource element is allocated to a pair of coded signals in a second wireless area;
the pair of coded signals is generated by coding a first modulation symbol $x_0$ and a second modulation symbol $x_i$ in space frequency block coding, the pair of coded signals including a first coded signal and a second coded signal, the first coded signal including the first modulation symbol $x_0$ as a first transmission symbol transmitted from the first antenna and a symbol $-x_1^*$ being obtained by inverting a sign of a complex conjugate of the second modulation symbol $x_1$ as a second transmission symbol transmitted from the second antenna, the second coded signal including the second modulation symbol $x_1$ as a third transmission symbol transmitted from the first antenna and a symbol $x_0^*$ being a complex conjugate of the first modulation symbol $x_0$ as a fourth transmission symbol transmitted from the second antenna; and
the second wireless area is different from the first wireless area.

19. The method according to claim 18,
the method further comprising:
in each of the first wireless area and the second wireless area,
allocating reference signals to two resource elements interposing two resource elements having successive frequencies therebetween along a frequency axis among six resource elements having successive frequencies, and
allocating one of a first pair of coded signals, one of a second pair of coded signals, the other of the first pair of coded signals, and the other of the second pair of coded signals to the remaining four resource elements among the six resource elements in an ascending order of the frequency, the first pair of coded signals being coded in space frequency block coding, the second pair of coded signals being coded in space frequency block coding.

20. A wireless communication system comprising:
a transmitting apparatus comprising a transmitter that transmits a wireless signal containing a pair of coded signals, the pair of coded signals being generated by coding a first modulation symbol $x_0$ and a second modulation symbol $x_1$ in space frequency block coding, the pair of coded signals including a first coded signal and a second coded signal, the first coded signal including the first modulation symbol $x_0$ as a first transmission symbol transmitted from a first transmitting antenna and a symbol $-x_i^*$ being obtained by inverting a sign of a complex conjugate of the second modulation symbol $x_1$ as a second transmission symbol transmitted from a second transmitting antenna, the second coded signal including the second modulation symbol $x_i$ as a third transmission symbol transmitted from the first transmitting antenna and a symbol $x_0^*$ being a complex conjugate of the first modulation symbol $x_0$ as a fourth transmission symbol transmitted from the second transmitting antenna; and
a receiving apparatus comprising:
a plurality of antennas that includes a first antenna and a second antenna;
a receiver that receives the wireless signal through the plurality of antennas; and
a processor that estimates a correlation between an interference noise on one of the pair of coded signals received through the first antenna and an interference noise on the other of the pair of coded signals received through the second antenna, and processes the received wireless signal using the correlation.

* * * * *